(12) United States Patent
Borhany

(10) Patent No.: US 11,907,677 B1
(45) Date of Patent: Feb. 20, 2024

(54) IMMUTABLE UNIVERSAL LANGUAGE ASSISTIVE TRANSLATION AND INTERPRETATION SYSTEM THAT VERIFIES AND VALIDATES TRANSLATIONS AND INTERPRETATIONS BY SMART CONTRACT AND BLOCKCHAIN TECHNOLOGY

(71) Applicant: Arash Borhany, Davis, CA (US)

(72) Inventor: Arash Borhany, Davis, CA (US)

( * ) Notice: Subject to any disclaimer, the term of this patent is extended or adjusted under 35 U.S.C. 154(b) by 0 days.

(21) Appl. No.: 18/116,734

(22) Filed: Mar. 2, 2023

Related U.S. Application Data

(60) Provisional application No. 63/315,931, filed on Mar. 2, 2022.

(51) Int. Cl.
| | |
|---|---|
| *G06N 20/00* | (2019.01) |
| *G06F 40/51* | (2020.01) |
| *G06F 21/64* | (2013.01) |
| *G06F 40/284* | (2020.01) |
| *G06V 40/20* | (2022.01) |
| *G10L 15/30* | (2013.01) |
| *G10L 15/22* | (2006.01) |
| *G10L 15/18* | (2013.01) |
| *G06F 40/58* | (2020.01) |

(52) U.S. Cl.
CPC .............. *G06F 40/51* (2020.01); *G06F 21/64* (2013.01); *G06F 40/284* (2020.01); *G06F 40/58* (2020.01); *G06V 40/28* (2022.01); *G10L 15/18* (2013.01); *G10L 15/22* (2013.01); *G10L 15/30* (2013.01)

(58) Field of Classification Search
None
See application file for complete search history.

(56) References Cited

U.S. PATENT DOCUMENTS

| | | | |
|---|---|---|---|
| 8,726,145 B2 * | 5/2014 | Schleppenbach | G06F 40/103 715/239 |
| 2016/0293051 A1 * | 10/2016 | Djugash | G09B 21/009 |
| 2018/0158369 A1 * | 6/2018 | Al Darwesh | G09B 21/007 |
| 2019/0081793 A1 * | 3/2019 | Martino | H04L 9/0894 |
| 2020/0117690 A1 * | 4/2020 | Tran | G06F 16/90332 |
| 2020/0136831 A1 * | 4/2020 | Danielson | H04L 9/3247 |
| 2021/0264117 A1 * | 8/2021 | Anglin | G06F 16/27 |
| 2021/0326901 A1 * | 10/2021 | Daley | G06N 20/00 |
| 2022/0078377 A1 * | 3/2022 | Mahadeva | H04N 7/152 |
| 2022/0269810 A1 * | 8/2022 | Tartan | H04L 9/3239 |
| 2022/0300487 A1 * | 9/2022 | Wright | G06Q 20/02 |
| 2022/0405752 A1 * | 12/2022 | Davies | G06Q 20/065 |
| 2023/0362010 A1 * | 11/2023 | Reeve | H04L 9/3239 |

\* cited by examiner

*Primary Examiner* — Seong-Ah A Shin
(74) *Attorney, Agent, or Firm* — Plager Schack LLP; Mark H. Plager; Stephen Hallberg

(57) ABSTRACT

A universal language assistive translation and interpretation system that is configured to verify and validate translations and interpretations by way of blockchain technology and smart contracts, multiple cross-format translation and interpretation blockchain validating and recording processes for verifying and validating cross-format translations and interpretations by smart contract and blockchain technology, and several validated cross-format translation and interpretation blockchain access processes for providing cross-format interpretations and translations of inter-communications between users regardless of ability or disability are disclosed.

17 Claims, 17 Drawing Sheets

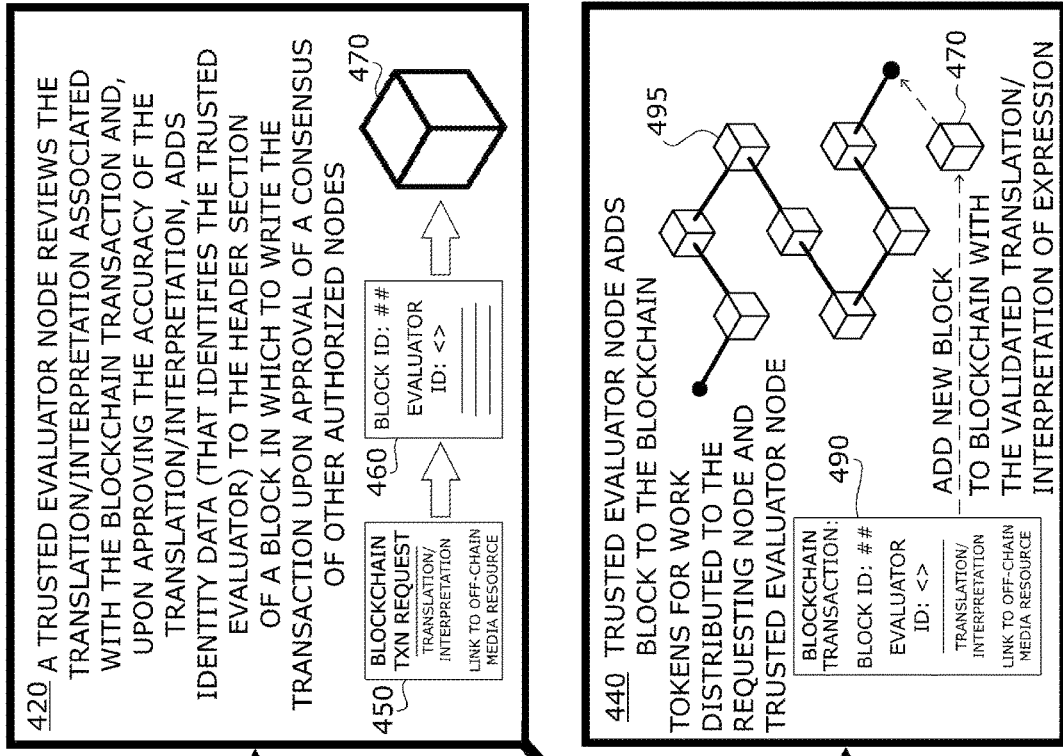
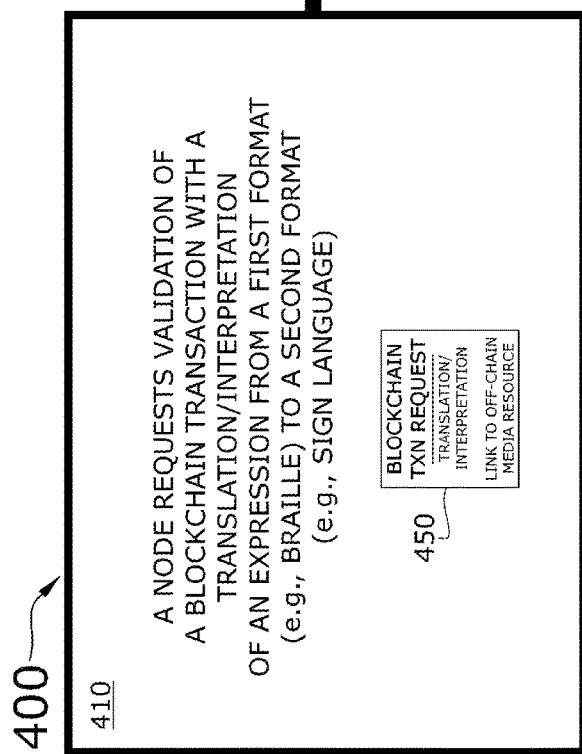
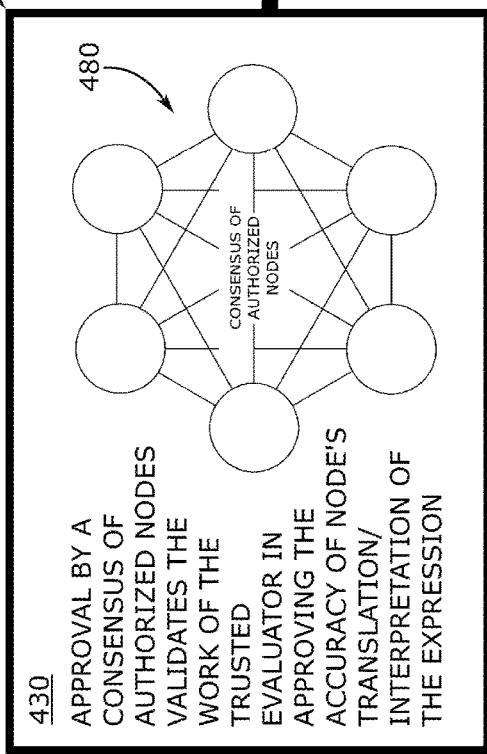
FIG. 4

IMMUTABLE UNIVERSAL LANGUAGE ASSISTIVE TRANSLATION AND INTERPRETATION SYSTEM THAT VERIFIES AND VALIDATES TRANSLATIONS AND INTERPRETATIONS BY SMART CONTRACT AND BLOCKCHAIN TECHNOLOGY

CLAIM OF BENEFIT TO PRIOR APPLICATION

This application claims benefit to U.S. Provisional Patent Application 63/315,931, entitled "Universal Languages Assistive Translator," filed Mar. 2, 2022. The U.S. Provisional Patent Application 63/315,931 is incorporated herein by reference.

BACKGROUND

Embodiments of the invention described in this specification relate generally to language translation, and more particularly, to a universal language assistive translation and interpretation system that verifies and validates translations and interpretations by smart contract and blockchain technology.

According to the National Center for Learning Disabilities (NCLD), about 11.75% of people worldwide identified as individuals with learning disabilities. According to the World Health Organization (WHO), over 1.5 billion people live with hearing loss. This number could rise to over 2.5 billion by 2050. In addition, 2.2 billion people have near or distant vision impairment.

The advent of text-to-speech and speech-to-text technology brought on a revolution in the digital-type communications worldwide, such that people who are blind or vision-impaired (or illiterate) can be provided speech from textual information (text-to-speech) and people who are deaf or hard of hearing can be provided text captions from audible vocalizations (speech-to-text). Additionally, previous systems started providing live captioning (also referred to as real-time captioning) which also brought on a revolution for individuals who were not able to understand live speech (e.g., such as by reading lips) when those individuals were hard of hearing, deaf, or otherwise not able to hear the spoken communications.

To date, these existing text-to-speech and speech-to-text systems and technologies constitute the state-of-the-art for cross-format communications. Cross-format communications involves providing an equivalent expression of communication in a format different from a native format in which the original communication is expressed. For example, providing text captions of spoken words or providing braille translation of alphanumeric text information.

Many individuals, businesses, and government agencies/sections have used the existing systems for years. While the existing systems have been utilized effectively, the scope of assistive technology utilized by the existing systems is very narrow. Currently, the existing systems only focus on translating spoken words to text or, conversely, providing audible output (vocalization) of text information. Yet, these existing systems are still prone to errors in translation/interpretation, and are typically limited to supporting only a single language (such as the local predominant language). Even when the language of underlying speech or text to interpret and translate matches the existing system's supported language, local variations in dialects and pronunciation hinder accuracy. Similarly, complex language structures of textual information can be difficult to convert to understandable speech.

The many limitations of the existing systems are clearly problematic for many individuals, including individuals who speak and hear well and those who have trouble or cannot hear, people who are blind or cannot see well, and other individuals with other disabilities or even multiple disabilities.

In addition, none of the existing platforms or systems provide effective cross-format interpretation and/or translation to Braille or sign language. In fact, neither sign language nor Braille is a universal language. For instance, there are more than three-hundred different sign languages currently in use around the world. These different sign languages vary from nation to nation. Any given sign language has an extensive vocabulary. For example, the American Sign Language (ASL) dictionary contains over 12,000 words/symbols/gestures, and each sign has three distinct parts, namely, (i) the hand shape, (ii) the position of the hands, and (iii) the movement of the hands. Similarly, there are over 200,000 braille codes which exist for over 133 different braille languages.

Furthermore, the existing systems only operate over a limited number of communication channels. However, current communication technology supports a wide range of different communication channels. While many of these communication channels may implement the existing systems for speech-to-text captioning and text-to-speech audio output, the range of users who may communicate is so wide (worldwide communication is now rather common on chat, social media, and other digital platforms, etc.) that the narrow solutions of existing systems do not fit the needs of and the problems encountered by so many present day users. For instance, with many more communication channels available, there is also many more opportunities for people with disabilities or multiple disabilities to be included as active and engaged users, but who are also limited in certain ways due to the lack of assistive technology offered by the existing systems.

Therefore, what is needed is a way to provide interpretation and translation between people with different physical abilities and disabilities (including individuals with learning disabilities as well as those with hearing or vision impairments) so that all people (regardless of their physical state of ability or disability) may easily and effectively engage independently in network and social communications with other people, businesses, and network around the world in different languages, sign languages, braille-encoded expressions, and all other forms of human expression.

BRIEF DESCRIPTION

Several embodiments of the invention are disclosed including (i) a universal language assistive translation and interpretation system that is configured to verify and validate translations and interpretations by way of blockchain technology and smart contracts, (ii) cross-format translation and interpretation blockchain validating and recording processes for verifying and validating cross-format translations and interpretations by smart contract and blockchain technology, and (iii) validated cross-format translation and interpretation blockchain access processes for providing cross-format interpretations and translations of inter-communications between users regardless of ability or disability.

In some embodiments, the universal language assistive translation and interpretation system comprises a plurality of operational components that verify and validate translations and interpretations by way of blockchain technology and smart contracts. In some embodiments, the plurality of operational components of the universal language assistive translation and interpretation system comprise a universal language assistive translation and interpretation server, an artificial intelligence (AI) expression recognition and natural language processing (NLP) engine, a client application session and expression input/output manager, a registered user settings database, an AI-models-for-sign-language-and-audio/voice-expression database, an expression creation system, a plurality of look-up tables (LUTs), at least one implementation of a blockchain and at least one corresponding smart contract, a plurality of nodes comprising passive user nodes, contributor nodes, and authorized nodes that validate and write transactions to blocks in the blockchain, an external oracle system that is configured to interact with resources outside of the blockchain, and a plurality of off-chain content databases.

In some embodiments, the cross-format translation and interpretation blockchain validating and recording processes for verifying and validating cross-format translations and interpretations by smart contract and blockchain technology comprise (i) a high-level proof-of-work blockchain validation and recording process for validating and recording cross-format translations and interpretations of expressions and (ii) a detailed proof-of-authority blockchain validation and recording process for validating and recording cross-format translations and interpretations of expressions.

In some embodiments, the validated cross-format translation and interpretation blockchain access processes for providing cross-format interpretations and translations of inter-communications between users regardless of ability or disability comprise (i) a blockchain-based text-to-audio process for providing spoken audio of text in any language, (ii) a process for interpreting a literal expression by semantic and language evaluation, (iii) a blockchain-based text-to-braille process for providing braille encoded expressions of text in any language, (iv) a blockchain-based text-to-sign language process for providing sign language expressions of text in any language, (v) a blockchain-based audio-to-text process for providing text expressions of spoken word audio in any language, (vi) a blockchain-based audio-to-sign language process for providing sign language expressions of audible speech in any language, (vii) a blockchain-based audio-to-braille process for providing braille-encoded expressions of spoken word audio in any language, (viii) a blockchain-based braille-to-text process for providing text expressions of braille-encoded expressions in any language, (ix) a blockchain-based braille-to-audio process for providing spoken audio of braille-encoded expressions in any language, and (x) a blockchain-based braille-to-sign language process for providing spoken sign language interpretations of braille-encoded expressions in any language.

BRIEF DESCRIPTION OF THE DRAWINGS

Having described the invention in general terms, reference is now made to the accompanying drawings, which are not necessarily drawn to scale, and wherein:

FIG. 4 conceptually illustrates a multi-stage diagram that demonstrates aspects of the detailed proof-of-authority blockchain validation and recording process of FIG. 3.

DETAILED DESCRIPTION

Figure 1:
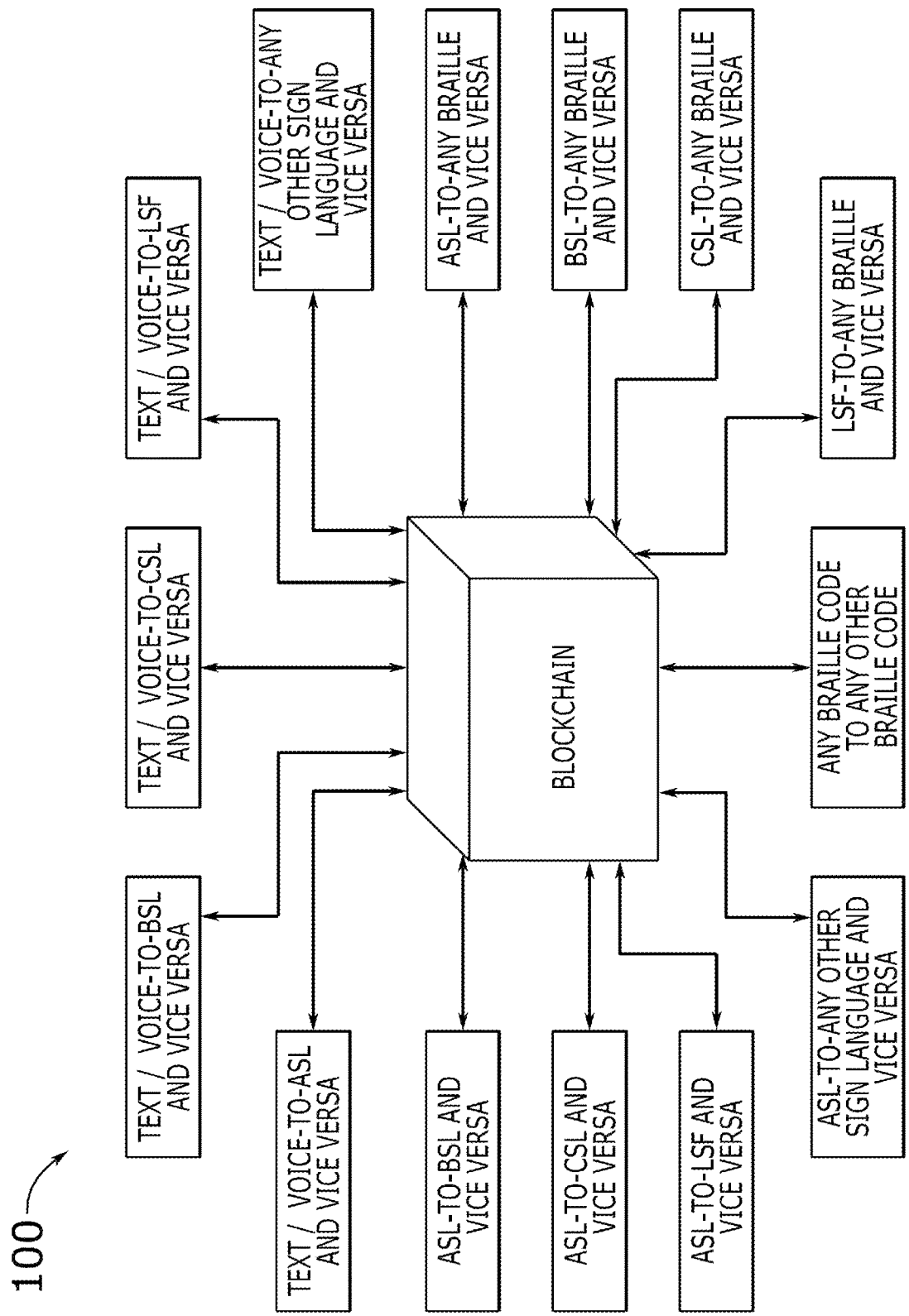
FIG. 1 conceptually illustrates a blockchain-based universal language assistive translation and interpretation system with examples of various translations and interpretations in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Embodiments of the universal language assistive translation and interpretation system and associated processes described in this specification solve the problems noted above by employing blockchain technology and smart contract functions through a globally accessible platform for any and all individuals including those with learning disabilities, hearing impaired, vision impaired, combinations of impairments and disabilities, etc.

In reference to conventional blockchain technology, the blockchain implementations associated with the blockchain-based universal language assistive translation and interpretation system is customized to optimize usage in the area of cross-format expression interpretation/translation. The customization relates in some way to parts of encrypted information, transactions, and trades, among other aspects. Therefore, some definitions are noted below in regards to the blockchain details described throughout this disclosure.

Specifically, a "token" refers to a digital asset defined by a project or smart contract. In this specification, a token is a digital asset that is given to each node works to provide a cross-format interpretation/translation of an expression and each node that reviews and validates the work of nodes who provide such cross-format interpretations/translations of expressions. A token is one of potentially many tokens that are available for distribution with respect to a particular blockchain (and in reference to a project related to any given cross-format type of interpretation/translation being tracked). In some embodiments, the number of tokens for a project is limited to a natural language limit. For instance, a text/voice-to-ASL blockchain or an ASL-to-BSL blockchain may limit the number of tokens to the number of United States English words/voices used to interpret to ASL by a gesture, plus available gestures representing ASL, plus UK English words used to interpret to BSL, plus gestures representing BSL, plus sign gestures that represent any ASL gesture interpreting to a BSL gesture. In some embodiments, the number of available tokens is defined by smart contract of the corresponding blockchain. However, since languages tend to be dynamic, evolving, and changing over time, additional words, signs, braille codes, etc., may be incorporated by the system and updated to the blockchain/smart contract implementation. In this way, nodes can earn more tokens by finding and updating those new language additions.

A "node" refers to users who participate in creating, reviewing, validating, and recording (in a blockchain) cross-format interpretation/translation content and who are bound by (and benefit from) the corresponding smart contract for such contributing work. In this specification, a node is variously referred in this specification as a "user", a "contributor" or a "contributing node", a "requesting node", a "trader", an "auditor", an "authorized user", an "authorized node", an "evaluator", a "trusted evaluator", a "miner", or other such terms.

The term "transaction" refers to a block on the blockchain that is created by a node offering an interpretation/translation of an expression. The transaction block is in a pending state until validate (and possibly until approval by a consensus of nodes).

The term "smart contract" refers to programs stored on a blockchain that run when predetermined conditions are met. Smart contracts in this specification enable all registered users to obtain cross-format interpretation services, including any text/voice-to-any given sign language, braille, video, audio, and mixed/matched among these different communication forms, as well as translations across different languages. Registered users may be considered passive users who do not contribute interpretation/translation content or content users who are permitted to contribute interpretations/translations (e.g., a contributor user) and, with suitable qualification, are permitted to review and validate interpretations/translations (e.g., a trusted evaluator user) offered by other content users. In some cases, users are considered registered by adding a subscription for the cross-format interpretation services. In some cases, smart contracts trigger distribution of rewards (tokens) to content users for their work (e.g., rewarding a contributor user with a token for a validated cross-format interpretation/translation that is added to the blockchain and rewarding a trusted evaluator user with a token for the work in reviewing and validating the cross-format interpretation/translation provided by the contributor user).

Embodiments of the universal language assistive translation and interpretation system and associated processes described in this specification differ from and improve upon currently existing options. In particular, some embodiments differ because the universal language assistive translation and interpretation system and associated processes are designed to include varying levels for sign language interpretation, which is done through a smart contract and blockchain. Examples of blockchain and related technology employed for the universal language assistive translation and interpretation system include, without limitation, Ethereum Virtual Machine using Solidity language, or EOS, Neo, Tezos, Tron, Polkadot, Algorand, or any other blockchain that provides better optimization, broader client reach, or otherwise provides more optimum user experience via better functionality and/or ease of being implemented and deployed. Notably, the blockchain deployment is often referred to in the singular tense. However, the universal language assistive translation and interpretation system may utilize several blockchains. For example, one blockchain to immutably record validated transactions with sign language to braille translations and another (separate) blockchain to immutably record validated transactions with braille to audible speech translations. Furthermore, in some embodiments, the universal language assistive translation and interpretation system comprises an artificial intelligence (AI) system and machine learning (ML) system whereby each blockchain may be used to support the creation of the functioning AI and smart contract system, including design and sale/subscription to users.

In this specification, reference is often made to a conceptual "user" who accesses and interacts with the universal language assistive translation and interpretation system. While the user may signify a single individual interacting with the universal language assistive translation and interpretation system, the user may also signify groups of individuals, such as those associated with schools, businesses, organizations, and firms in the private or public sectors in any country around the world. In that case, the "user" would signify any individual among the many individuals within that group. Furthermore, such group "users" could utilize and/or deploy the universal language assistive translation and interpretation system as a way to provide assistive services for their individual users or others associated the corresponding group. For instance, a business may deploy the universal language assistive translation and interpretation system during events, seminars, meetings, research, training, classes, etc., in compliance with the Americans with Disabilities Act (ADA) or equivalent rules, regulations, or laws in other jurisdictions or countries. While some deployments of the universal language assistive translation and interpretation system are intended for private, exclusive usage within or by permission of a group, other deployments of the universal language assistive translation and interpretation system are public. For instance, the universal language assistive translation and interpretation system of the present disclosure may be deployed in a cloud-compute environment. As such, the universal language assistive translation and interpretation system would support hardware (such as a cloud server) that hosts a cloud application service that provides universal cross-format translations and interpretations of expressions between users of different abilities. When combined with blockchain technology, some of the users are incentivized to contribute expertise in providing, reviewing, and/or validating accurate translations and interpretations from one format to another (e.g., from sign language to braille, from braille to text, from audible speech to braille, etc.). Blockchain deployments are capable of providing an incentivization mechanism in the form of tokens. Thus, when users are able to provide translations and interpretations of expressions across different formats, they may be awarded tokens. Similarly, when users are able to review and validate interpretations/translations of expressions, they also are awarded tokens. The specific details for rewarding and distributing tokens is described in more detail below. Additionally, as more users subscribe and use the universal language assistive translation and interpretation system, the value of the tokens may increase, and more rewards may be granted to user nodes associated the blockchain.

In some embodiments, the data also will be updated by those who have worked in the field. For instance, translators of American sign language (ASL) may be able to provide accurate interpretations/translations of text or voice expressions in English (or even in another language). Similarly, translators of other sign languages, such as British sign language (BSL), Chinese sign language (CSL), French sign language (LSF), etc., may provide accurate interpretations/translations of text/voice expressions to the respective sign language. Of course, interpretations and translations are not limited to text/voice to sign language. In fact, the universal language assistive translation and interpretation system supports various translations and interpretations across many forms (e.g., one sign language to another sign language, one braille language to another braille language, sign language in any language to braille in any other language, and conversely, braille in any language to sign language of another language, and so on). An example of various translations and interpretations supported by the universal language assistive translation and interpretation system is described next, by reference to FIG. 1.

Specifically, FIG. 1 conceptually illustrates a blockchain-based universal language assistive translation and interpretation system 100 with examples of various translations and interpretations. As shown in this figure, the blockchain-based universal language assistive translation and interpretation system 100 includes a blockchain implementation that is configured to immutably record cross-format interpretations/translations of expressions in each one of several varieties including, without limitation, text/voice-to-ASL and vice versa, text/voice-to-BSL and vice versa, text/voice-to-CSL and vice versa, text/voice-to-LSF and vice versa, text/voice-to-any-other sign language (e.g., DGS, which refers to "Deutsche Gebardensprache" or, in English, German Sign Language) and vice versa, ASL-to-any braille and vice versa, BSL-to-any braille and vice versa, CSL-to-any braille and vice versa, LSF-to-any braille and vice versa, any braille encoded form to any other braille encoded form (e.g., contracted braille versus non-contracted braille, or braille between different languages, etc.), ASL-to-BSL and vice versa, ASL-to-CSL and vice versa, ASL-to-LSF and vice versus, ASL-to-any other sign language and vice versa, and many more. The blockchain represented at the center of these types of supported cross-format interpretations/translations is intended only as exemplary, since in practice a separate blockchain implementation would be deployed for each type of cross-format interpretation/translation type.

The cross-format interpretations/translations of expressions are created by nodes/users who contribute content such as video clips, sign language gestures, animations, GIFs, symbols, and other imagery, audio clips, etc. Typically, contributing nodes/users utilize any technology they are comfortable with or have installed on their machines to create such sign language gestures, symbols, GIFs, etc., or may simply capture video of their own hand movements expressing the interpreted/translated sign language. For instance, a node/user may provide a certain sign language interpretation/translation of a spoken expression (speech-to-sign language) by making a block in the blockchain in which the node (user) suggests or creates a sign language gesture/sign/GIF/symbol/image/video for a single word in the spoken expression or each particular word in the spoken expression in any given language (e.g., English-to-ASL). Similarly, a node may create or suggest a gesture/sign/GIF/symbol/image/video in ASL that is equivalent to another gesture/sign/GIF/symbol/image/video in BSL (e.g., BSL-to-ASL) or participate in creation of any gesture in a given sign language that is an interpretation/translation from braille code in a given braille language (and vice versa). Furthermore, nodes/users need not have their own technology or cameras to contribute sign language interpretations/translations because the universal language assistive translation and interpretation system includes an expression creation system through which sign language content can be created by nodes/users seeking to contribute their proposed interpretations/translations. Further details of the expression creation system are described below, by reference to FIG. 15.

Figure 2:
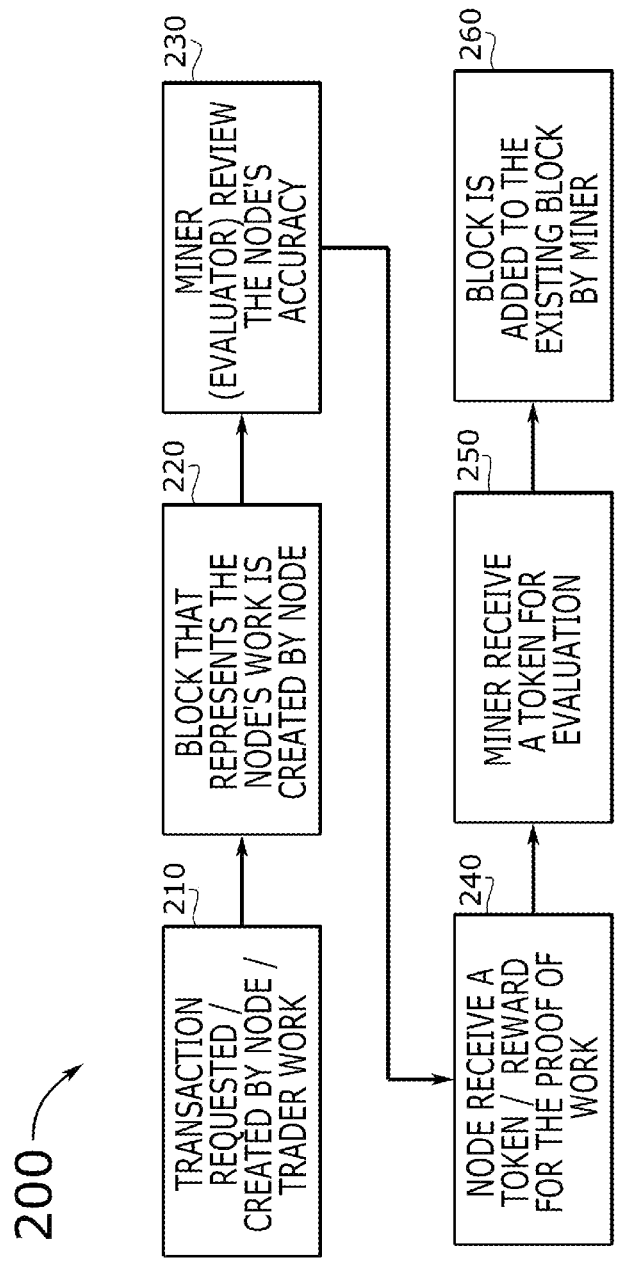
FIG. 2 conceptually illustrates a high-level proof-of-work blockchain validation and recording process for validating and recording cross-format translations and interpretations of expressions in some embodiments.

Each node also maintains a log with copies of their blockchain transactions. However, in some embodiments, each blockchain transaction with an interpretation/translation offered by a contributor node remains in a pending state until approval by a miner node in a proof-of-work blockchain implementation or by a trusted evaluator node in a proof-of-authority blockchain implementation, where approval of the trusted evaluator node's review of the interpretation/translation is needed from a consensus of other authorized nodes. The operations involved in proof-of-work are demonstrated in a proof-of-work blockchain validation and recording process for validating and recording cross-format translations and interpretations of expressions in a blockchain, which is described below by reference to FIG. 2. Also, the operations involved in proof-of-authority are demonstrated in a proof-of-authority blockchain validation and recording process for validating and recording cross-format translations and interpretations of expressions in a blockchain, which is described below by reference to FIG. 3. Nodes (both the contributor node and the miner node/trusted evaluator node) receive token rewards for their respective work, when the work is validated and added to the blockchain. On the other hand, if a trusted evaluator node rejects an interpretation/translation offered by the contributor node, then the transaction/block is not recorded on the blockchain and the node may discard the copy of the blockchain transaction from their log or simply mark it in the log as a failed transaction.

Some of the users of the blockchain-based universal language assistive translation and interpretation system are going to be passive users who benefit from the blockchain-based system by their communicative interaction with other users, such as over a multi-format communication channel, but who neither contribute interpretations/translations nor review/validate interpretations/translations. Some other users, however, may contribute interpretations/translations of expressions to immutably record in the blockchain. Such users can be referred to as contributors (that is, users who either provide interpretations/translations for review before being recorded in the blockchain). Some contributor users are also considered to be auditors, who are qualified to provide valid, accurate review and approval of interpretations/translations. In some embodiments, passive users, contributors, and auditors are defined by their interaction with the universal language assistive translation and interpretation system. However, in some embodiments, the universal language assistive translation and interpretation system limits contributors to those users who actively set a permission to engage with the system to provide interpretations/translations of expressions for review. Furthermore, the universal language assistive translation and interpretation system of some embodiments limits auditors to those users who demonstrate a suitable level of expertise or experience in their respective area. Thus, in some embodiments, user permissions are set for contributors at large and for auditors, where auditors have a limited set of permissions that excludes other users from engaging in review and validation (or approval) of interpretations/translations provided by other contributors. Thus, in these embodiments, the contributor permissions are defined formally after initial user settings are specified, and not by mere interaction with the universal language assistive translation and interpretation system. Accordingly, those who contribute to edit or create the data will be monitored by the auditors (hereinafter, also referred to as "authorized users", "evaluators", "trusted evaluators", etc.) for the accuracy of their translations/interpretations of various expressions input in one format (e.g., voice) and translated/interpreted to another form (e.g., braille) and possibly across different languages (e.g., ASL to Japanese braille). Once accuracy of a given user's translation/interpretation is confirmed (or "validated"), the data will is updated in a transaction to write in a block of the corresponding blockchain. Those contributors (both the user who provided the interpretation/translation of an expression and the trusted evaluator who reviewed and confirmed the accuracy of the interpretation/translation of the expression) receive tokens (or "points", "digital coins", "digital assets", or other blockchain-based or non-blockchain reward). While there is a difference between a contributor user and an auditor user, it is noted here that auditor users have all the capabilities of contributor users to provide their own interpretations/translations of expressions—ultimately to be submitted for review by at least one other auditor in the corresponding area of expertise.

As noted above, the blockchain-based universal language assistive translation and interpretation system supports different types of blockchain implementations. One type of blockchain implementation is a proof-of-work blockchain. By way of example, FIG. 2 conceptually illustrates a high-level proof-of-work blockchain validation and recording process 200 for validating and recording cross-format translations and interpretations of expressions in some embodiments. As shown in this figure, the high-level proof-of-work blockchain validation and recording process 200 starts with a transaction request from a node (also referred to as a "trader") that has contributed a cross-format interpretation/translation of some expression (at 210). The high-level proof-of-work blockchain validation and recording process 200 moves to the next step at which the requesting node creates a block that represents the node's work (at 220). Specifically, the cross-format interpretation/translation in the requested transaction is considered the requesting node's work. However, the cross-format interpretation/translation is not added to the block until an evaluator node reviews and validates the accuracy of the cross-format interpretation/translation.

After the transaction block is created (with addition of the cross-format interpretation/translation pending validation by an evaluator node), the high-level proof-of-work blockchain validation and recording process 200 proceeds forward to a step at which an evaluator node (also referred to as a "miner") reviews the accuracy of the requesting node's cross-format translation/interpretation of the expression (at 230). When the work of the requesting node is validated by the evaluator node, the smart contract triggers distribution of a reward for the requesting node. This is shown in the next step of the high-level proof-of-work blockchain validation and recording process 200, at which the requesting node receives a token (as a reward) for the proof of work in preparing a valid and accurate cross-format interpretation/translation of the expression (at 240). Similarly, smart contract kicks in to trigger a reward for the evaluator node, as shown at the next step of the high-level proof-of-work blockchain validation and recording process 200 during which the evaluator node (miner) receives a token for the evaluation of accuracy of the requesting node's cross-format translation/interpretation of the expression (at 250). Then the high-level proof-of-work blockchain validation and recording process 200 proceeds to a step at which the evaluator node adds the validated (accurate) cross-format translation/interpretation of the expression to the existing transaction block (created by the requesting node at step 220) and commits the block to the blockchain (at 260).

Figure 3:
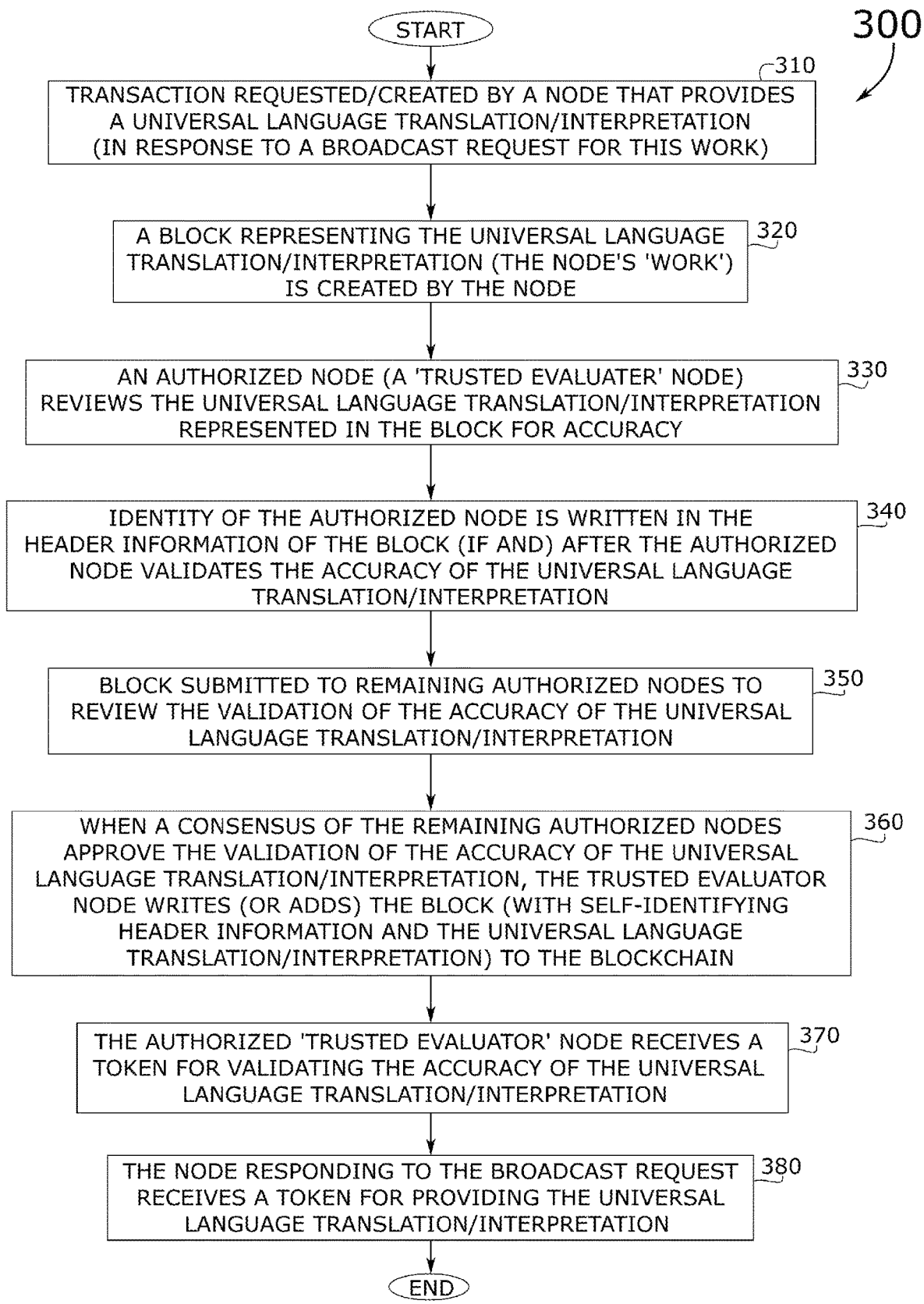
FIG. 3 conceptually illustrates a detailed proof-of-authority blockchain validation and recording process for validating and recording cross-format translations and interpretations of expressions in some embodiments.

Turning now to an example of a proof-of-authority type of blockchain implementation supported by the universal language assistive translation and interpretation system, FIG. 3 conceptually illustrates a detailed proof-of-authority blockchain validation and recording process 300 for validating and recording cross-format translations and interpretations of expressions in some embodiments. Reference is made to FIG. 4 throughout the following description of the detailed proof-of-authority blockchain validation and recording process 300.

Referring first to FIG. 3, the detailed proof-of-authority blockchain validation and recording process 300 starts when a transaction is requested/created by a contributing node that provides an interpretation/translation of an expression (at 310) followed by the contributing node creating a block representing the node's work (at 320). In some embodiments, the universal language assistive translation and interpretation system broadcast a request to contributing nodes to create an interpretation/translation of an expression when the corresponding blockchain does not have a record of such an interpretation/translation for the expression. Otherwise, when an existing, validated (and accurate) interpretation/translation for the expression is recorded in the blockchain, the universal language assistive translation and interpretation system would simply operate in a way to access the particular block of the blockchain in which that interpretation/translation of the expression is recorded and provide the interpretation/translation to the receiving user who is engaged in a cross-format communication with another user (who provided the expression to be interpreted/translated).

Now referring to FIG. 4, a multi-stage diagram 400 that demonstrates aspects of the detailed proof-of-authority blockchain validation and recording process 300 of FIG. 3 is conceptually illustrated. Specifically, the multi-stage diagram 400 demonstrates various stages of the detailed proof-of-authority blockchain validation and recording process

300 over four stages, namely, a first stage 410, a second stage 420, a third stage 430, and a fourth stage 440. During the first stage 410, a transaction block 450 is created by the requesting node seeking validation of the node's work in preparing the interpretation/translation of the expression. In this example, the expression was received (from a first user) in a first form/format (e.g., braille-encoded data) and needs to be converted into a second form/format suitable for a second user (e.g., sign language). As such, the interpretation/translation of the expression by the requesting node may include imagery, gestures, GIFs, symbols, and/or video clips that express the braille-based expression in sign language (i.e., as interpreted/translated from braille form).

In some embodiments, the interpretations/translations that involve multi-media (e.g., audio clips, video clips, art/iconography, gestures, GIFs, symbols, etc.) are recorded to blocks of the blockchain as resource links which, when accessed, navigate to off-chain media resources, such as cloud databases, repositories, and the like. The blockchain-based universal language assistive translation and interpretation system supports off-chain storage of such multi-media because on-chain computation, rendering, loading, or other access can be too expensive (in time and/or in processing power) to provide realtime cross-format interpretations/translations of expressions. However, by supporting off-chain resources, it is possible for the universal language assistive translation and interpretation system to outsource the storage of critical multi-media files and the computation involved in loading, rendering, or otherwise accessing the materials to off-chain systems, resources, repositories, etc. Specifically, the universal language assistive translation and interpretation system supports such off-chain resources in connection with blockchain by employing an external oracle system that is configured to operate between the blockchain and the off-chain resource. Also, off-chain resource support and computation may be implemented in multiple ways. One way involves the external oracle which operates effectively, but gives rise to a question of whether the external oracle system can be trusted. Another way of implementing off-chain resource support and computation involves utilization of a decentralized oracle system, where several independent off-chain actors would provide off-chain resource access and computation services (as needed) to the universal language assistive translation and interpretation system. In this decentralized oracle scheme, the independent off-chain actors can be incentivized to accurately carry out operations and accurately perform any processing by tokenization, whereby they may be rewarded with tokens when their actions result in correct outcomes. An example of the universal language assistive translation and interpretation system that employs an external oracle system to access an off-chain resource is described below, by reference to FIG. 15.

Turning back to FIG. 3, after the block is created by the contributing node, the detailed proof-of-authority blockchain validation and recording process 300 moves to the next step at which an authorized node (or 'trusted evaluator' node) reviews the interpretation/translation of the expression represented in the block for accuracy (at 330). As mentioned previously, the trusted evaluator node is authorized to review the work of contributing/requesting nodes due to a certain level of demonstrated expertise or experience in handling cross-format interpretations/translations in certain areas (e.g., expertise in understanding a sign language, braille, spoken word in one or another language, etc.). Each implementation and deployment of the universal language assistive translation and interpretation system may determine qualifications of such nodes in their own manner. For instance, it may be acceptable to provide certificates, degrees, experiential history, or other evidence of command and expertise in the area of cross-format interpretation/translation (e.g., expertise by a native English speaking and hearing-able user who also has full understanding and experience in ASL, or expertise by a user who has full command of ASL and another sign language, or expertise in one braille system to another, etc.). Alternatively, the universal language assistive translation and interpretation system deployment may qualify certain users as trusted evaluators by way of a test (e.g., an online test) in a particular domain/area of cross-format interpretation/translation.

After the trusted evaluator node completes the review for accuracy of the interpretation/translation of the expression, and upon the trusted evaluator node validating the accuracy of the interpretation/translation of the expression, the detailed proof-of-authority blockchain validation and recording process 300 moves to the next step at which the identity of the trusted evaluator node is written in the header information of the block representing the interpretation/translation of the expression (at 340).

Turning to FIG. 4, the second stage 420 demonstrates the process of the trusted evaluator node reviewing the interpretation/translation of the expression available in the transaction block 450 as created and provided by the contributing node, followed by adding the block ID and the trusted evaluator node's identity data to the header section of the block 460, rendering an updated block 470 that is presented to the authorized nodes for consensus approval.

Consensus approval by the other authorized nodes is not based on all nodes associated with the blockchain, since some nodes are not qualified as trusted evaluators. Instead, in some embodiments, the smart contract executes a search of other authorized nodes upon (and based on) the identity of the trusted evaluator node being written into the header information of the block. The identity of the trusted evaluator node enables the search to hone in on other authorized nodes with expertise that qualifies them to review the trusted evaluator node's validation of accuracy of the interpretation/translation of the expression.

Turning back to FIG. 3, the detailed proof-of-authority blockchain validation and recording process 300 moves to the next step at which the block is submitted to the other authorized nodes to review the trusted evaluator node's validation of the accuracy of the interpretation/translation of the expression (at 350). In some embodiments, approval of the trusted evaluator node's validation of the accuracy of the interpretation/translation by a consensus of the authorized nodes is needed before the block can be added to the blockchain.

Referring again to FIG. 4, the third stage 430 demonstrates approval by a consensus of authorized nodes 480. The approval by the consensus validates the work performed by the trusted evaluator node in reviewing the accuracy of the interpretation/translations provided by the contributing node.

Now referring back to FIG. 3, when approval by the consensus of the other authorized nodes is achieved, the detailed proof-of-authority blockchain validation and recording process 300 proceeds to a step at which the trusted evaluator node writes the block to the blockchain (at 360). The next steps of the detailed proof-of-authority blockchain validation and recording process 300 are triggered by smart contract execution which distributes a token to the trusted evaluator node for validating the accuracy of the interpretation/translation of the expression (at 370) and distributes another token to the contributing node for providing the interpretation/translation of the expression (at 380). Then the detailed proof-of-authority blockchain validation and recording process 300 ends.

These final steps of the detailed proof-of-authority blockchain validation and recording process 300 are demonstrated by reference to FIG. 4. Specifically, as show in the fourth stage 440, the consensus approved and validated interpretation/translation transaction 490 is written to the updated block 470 which itself is added to the blockchain 495.

While several examples above refer to off-chain resources and/or systems, as well as utilization of external oracle systems in connection with such off-chain resources, the universal language assistive translation and interpretation system also supports on-chain storage of interpretation/translation data. In effect, whether off-chain resources and/or external oracle systems are utilized or not, the blockchain itself provides a central repository for retrieval of interpretations/translations to enhance communication between multiple users connected over one or more communication channels in one or more sessions accessing the universal language assistive translation and interpretation system. For instance, if a first user (who may have a vision impairment) communicates and expression by speech (audio feed) to a second user (who may have a hearing impairment), the universal language assistive translation and interpretation system looks for a validated interpretation/translated of the audible spoken expression in an associated speech-to-text blockchain and, upon discovering such validated interpretation/translation, pulls the text form of the expression to present as text for the second user to read. Meanwhile, the second user may input text of a responding expression which, because the first user has a vision impairment, needs to be converted to another suitable form, such as audio or braille—supposing the universal language assistive translation and interpretation system finds a validated braille-encoded form of the responding expression in a text-to-braille blockchain, the universal language assistive translation and interpretation system pulls the braille-encoded data and transmits this data back to the first user's monitor in realtime (assuming the first user has a refreshable braille display that is configured to output the braille-encoded data). This is demonstrated by examples described by reference to FIGS. 5-14, below.

Figure 5:
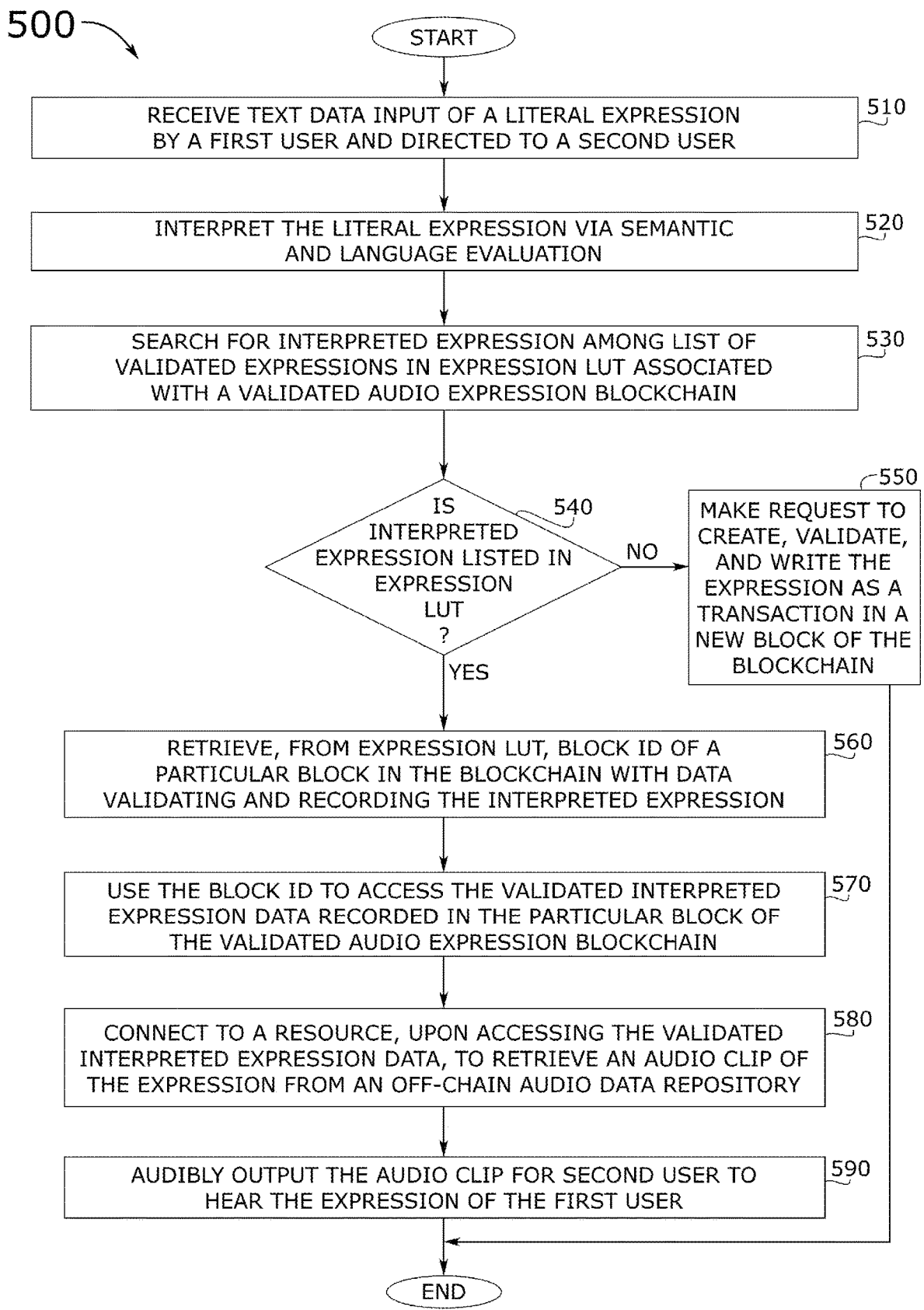
FIG. 5 conceptually illustrates a blockchain-based text-to-audio process for providing spoken audio of text in any language in some embodiments.

For instance, FIG. 5 conceptually illustrates a blockchain-based text-to-audio process 500 for providing spoken audio of text in any language in some embodiments. In some embodiments, the blockchain-based text-to-audio process 500 is performed by a smart contract recorded on a validated text-to-audio expression blockchain that underpins a cross-format text-to-audio user communication session between different users (e.g., a first user who may or may not have a hearing impairment but prefers to communicate in text and a second user who may or may not have a vision impairment but prefers to communicate in speech/audio).

As shown in this figure, the blockchain-based text-to-audio process 500 starts by receiving text data, input by a first user, of a literal expression that is directed to a second user (at 510). Specifically, the first user and the second user are communicating across a communication channel that is facilitated by the universal language assistive translation and interpretation system. In some embodiments, the communication channel is a cross-format communication channel that is provided through a common client session managed by the universal language assistive translation and interpretation system. An example of a common client session hosting a cross-format communication channel supporting braille-to-sign language (and vice versa) as managed by the universal language assistive translation and interpretation system is described below, by reference to FIG. 15.

After receiving the text data input of the literal expression, the blockchain-based text-to-audio process 500 of some embodiments interprets the literal expression by way of semantic and language evaluation (at 520) that assesses the meaning of the expression and checks for any language differences between the first user and the second user. In this way, the interpretation of the literal expression can yield an interpreted expression that is semantically accurate. Specific details of a process for interpreting a literal expression by semantic and language evaluation are described below, by reference to FIG. 6.

After interpretation of the literal expression is completed, the blockchain-based text-to-audio process 500 searches for an entry with the interpreted expression among a list of validated expressions in an expression LUT associated with a validated text-to-audio expression blockchain (at 530). Then the blockchain-based text-to-audio process 500 determines (at 540) whether the interpreted expression is listed in the expression LUT (and, therefore, recorded in the validated text-to-audio expression blockchain). When the interpreted expression is not listed in the expression LUT ('NO'), the blockchain-based text-to-audio process 500 of some embodiments makes a request to create and validate a cross-format audio version of the interpreted text-based expression and to write a transaction block for the cross-format audio expression in a block of the validated text-to-audio expression blockchain (at 550). Then the blockchain-based text-to-audio process 500 ends. However, the universal language assistive translation and interpretation system does not stop processing with respect to this cross-format communication channel between the first user and the second user. Instead, the universal language assistive translation and interpretation system automatically starts processing of one of the cross-format translation and interpretation blockchain validating and recording processes for verifying and validating cross-format translations and interpretations by smart contract and blockchain technology. Which cross-format translation and interpretation blockchain validating and recording process is executed depends on whether the validated text-to-audio expression blockchain is implemented as a proof-of-work blockchain or a proof-of-authority blockchain. Thus, for sake of continuity, the blockchain-based text-to-audio process 500 at this point would not seem to end, but would rather seamlessly transition to the start of either the proof-of-work blockchain validation and recording process 200, described above by reference to FIG. 2, or the proof-of-authority blockchain validation and recording process 300, described above by reference to FIG. 3.

Turning back to the determination (at 540), when the interpreted expression is affirmatively listed in the expression LUT ('YES'), the blockchain-based text-to-audio process 500 of some embodiments proceeds to a step for retrieving, from the expression LUT, a block identifier (or "block ID") associated with a particular block in the validated text-to-audio expression blockchain (at 560). The block ID that is retrieved is a data point within the LUT entry with the interpreted expression listing in the expression LUT. Also, the block ID corresponds to a particular validated audio expression recorded in the particular block of the validated text-to-audio expression blockchain.

After retrieving the block ID from the expression LUT, the blockchain-based text-to-audio process 500 then uses the block ID to access the particular block in the validated text-to-audio expression blockchain in which the particular validated expression is recorded (at 570). Notably, the particular validated audio expression recorded in the particular block may refer to an off-chain resource by a link which, when accessed, triggers an external oracle system to navigate to the off-chain resource and retrieve an audio clip, audio file, sound-wave, or other audible representation of the particular validated audio expression. This is demonstrated in the next step of the blockchain-based text-to-audio process 500 which involves connecting to the resource (such as the off-chain resource and by way of the external oracle system) to retrieve the audio version of the interpreted text expression (at 580). Finally, the blockchain-based text-to-audio process 500 audibly outputs the audio clip of the semantically accurate expression for the second user to hear (at 590). Then the blockchain-based text-to-audio process 500 ends.

Figure 6:
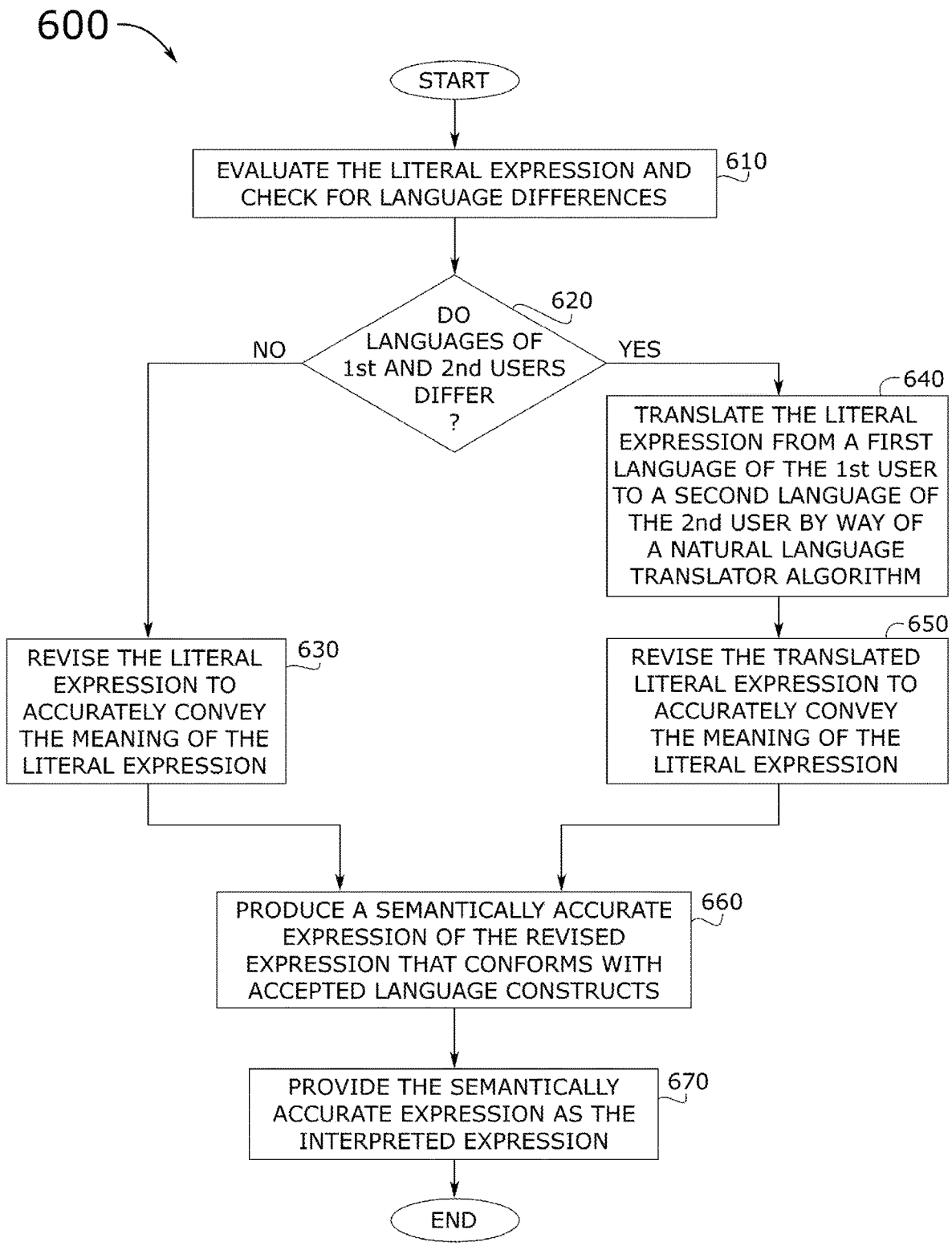
FIG. 6 conceptually illustrates a process for interpreting a literal expression by semantic and language evaluation in some embodiments.

By way of another example, FIG. 6 conceptually illustrates a process for interpreting a literal expression by semantic and language evaluation 600. In some embodiments, the process for interpreting a literal expression by semantic and language evaluation 600 is performed by a smart contract in connection with a natural language translator algorithm of an AI expression recognition and NLP engine of the blockchain-based universal language assistive translation and interpretation system, and where the smart contract itself is recorded on a particular blockchain that is utilized for a particular type of cross-format user communication session between different users.

As shown in this figure, the process for interpreting a literal expression by semantic and language evaluation 600 starts by evaluating a literal expression and checking for language differences between the different users (at 610). The process for interpreting a literal expression by semantic and language evaluation 600 then determines (at 620) whether language differences between the different users (e.g., a first user and a second user) exist. When there are no language differences between the user (1\10'), the process for interpreting a literal expression by semantic and language evaluation 600 revises the literal expression to accurately convey the meaning of the literal expression (at 630) and proceeds forward to produce a semantically accurate expression (at 660), which is described further below.

On the other hand, when the languages between the users are determined (at 620) to differ (YES'), then the process for interpreting a literal expression by semantic and language evaluation 600 proceeds to a step for translating the literal expression (at 640). Specifically, the literal expression is translated from a first language used by the first user to a second language used by the second user. In some embodiments, the smart contract triggers the AI expression recognition and NLP engine to carry out the natural language translator algorithm for the translation. After translation is completed, the process for interpreting a literal expression by semantic and language evaluation 600 revises the translated literal expression (at 650) to accurately convey the meaning of the literal expression.

The process for interpreting a literal expression by semantic and language evaluation 600 of some embodiments then proceeds to the step for producing the semantically accurate expression (at 660) of the revised expression (or revised translated expression). The semantically accurate expression is produced (at 660) in a manner that conforms with accepted language constructs. In some embodiments, the process for interpreting a literal expression by semantic and language evaluation 600 then provides the semantically accurate expression as the interpreted expression (at 670).

For instance, the interpreted expression is provided back to the calling step of another process, such as the step for interpreting the literal expression by way of semantic and language evaluation (at 520) in the blockchain-based text-to-audio process 500, described above by reference to FIG. 5. Then the process for interpreting a literal expression by semantic and language evaluation 600 ends.

Figure 7:
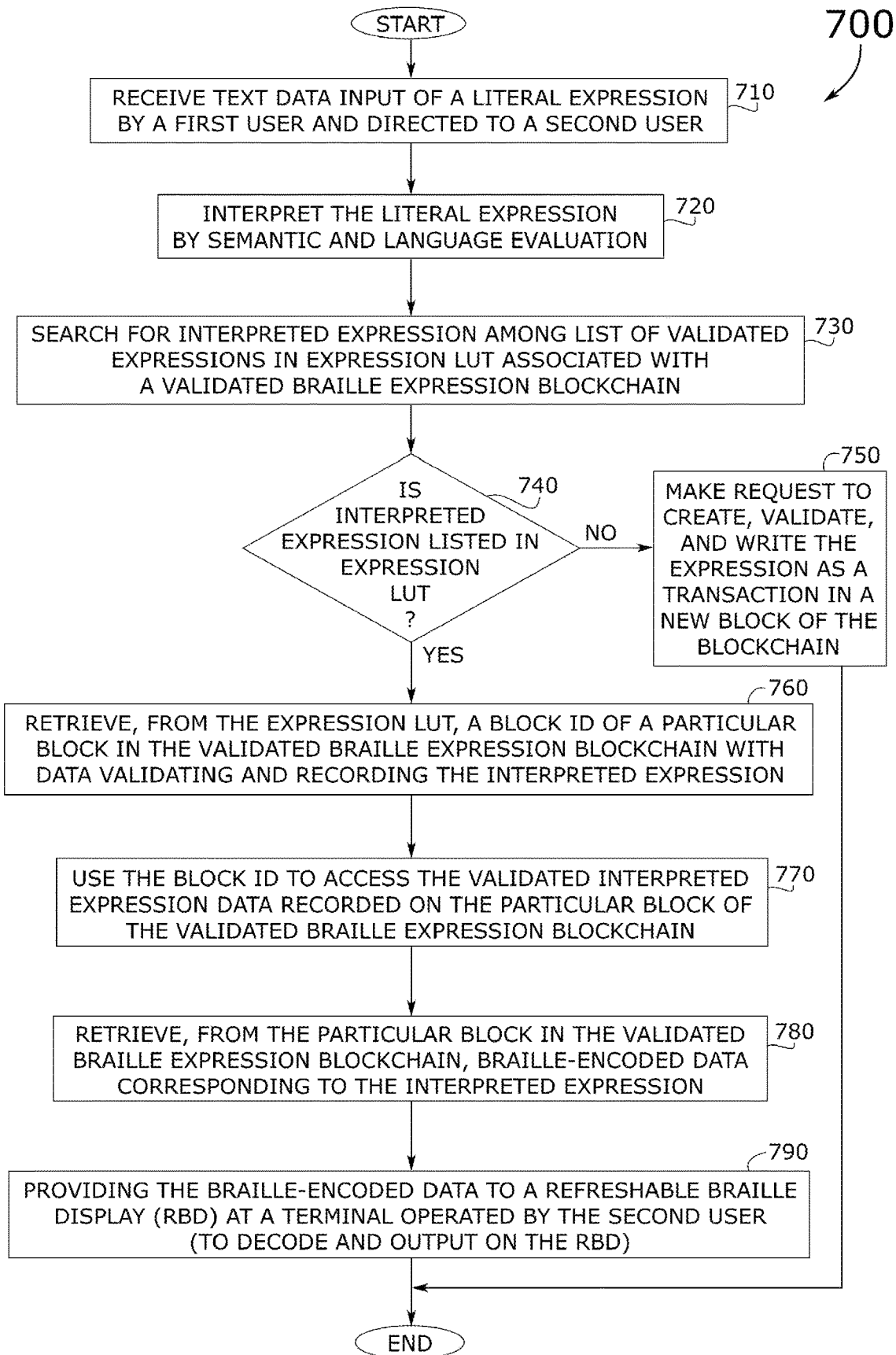
FIG. 7 conceptually illustrates a blockchain-based text-to-braille process for providing braille encoded expressions of text in any language in some embodiments.

Now referring to another type, FIG. 7 conceptually illustrates a blockchain-based text-to-braille process 700 for providing braille encoded expressions of text in any language in some embodiments. In some embodiments, the blockchain-based text-to-braille process 700 is performed by a smart contract recorded on a validated text-to-braille expression blockchain that is utilized for a cross-format text-to-braille user communication session between different users (e.g., a first user who may or may not have a hearing impairment yet prefers to communicate in text and a second user who may have a vision impairment and who prefers to communicate in braille).

As shown in this figure, the blockchain-based text-to-braille process 700 starts by receiving text data input of a literal expression by a first user and directed to a second user (at 710). After receiving the literal expression, the blockchain-based text-to-braille process 700 moves on to the step of interpreting the literal expression by semantic and language evaluation of the expression (at 720). As noted above, the step for interpreting the literal expression by semantic and language evaluation of the expression is carried out by another multi-step process, such as the process for interpreting a literal expression by semantic and language evaluation 600, described above by reference to FIG. 6.

Next, the blockchain-based text-to-braille process 700 starts searching (at 730) for the interpreted expression among a list of validated expressions in the expression LUT associated with the validated text-to-braille blockchain. Then the blockchain-based text-to-braille process 700 of some embodiments proceeds to a step for determining (at 740) whether the interpreted expression is listed in the expression LUT (and, thus, recorded in the blockchain).

When the interpreted expression is not listed in the expression LUT ('NO'), the blockchain-based text-to-braille process 700 makes (or broadcasts) a request to authorized nodes to create and validate a cross-format braille version of the interpreted text-based expression and to write a transaction block for the cross-format braille expression in a block of the validated text-to-braille expression blockchain (at 750). Then the blockchain-based text-to-braille process 700 ends. However, as noted above, processing continues through one of the cross-format translation and interpretation blockchain validating and recording processes, depending on the type of blockchain implementation (either proof-of-work or proof-of-authority). Specifically, processing continues after making the request to authorized nodes to create and validate the cross-format braille version of the interpreted text-based expression and to write the transaction block for the cross-format braille expression in the block of the validated text-to-braille expression blockchain (at 750), seamlessly transitioning to the start of either the proof-of-work blockchain validation and recording process 200, described above by reference to FIG. 2, or the proof-of-authority blockchain validation and recording process 300, described above by reference to FIG. 3.

Turning back to the determination (at 740), when the interpreted expression is affirmatively listed in the expression LUT ('YES'), the blockchain-based text-to-braille process 700 moves forward to a step for retrieving (at 760) a block identifier (or "block ID") from the expression LUT.

The block ID identifies a particular block in the validated text-to-braille expression blockchain and is retrieved as a data point within the LUT entry listing with the interpreted expression in the expression LUT. Further, the block ID corresponds to a particular validated braille expression recorded in the particular block of the validated text-to-braille expression blockchain.

The blockchain-based text-to-braille process 700 then uses the retrieved block ID to access the particular block in the validated text-to-braille expression blockchain in which the particular validated braille expression is recorded (at 770). Following this step, the blockchain-based text-to-braille process 700 retrieves (at 780) braille-encoded data of the particular validated braille expression (which corresponds to the interpreted expression) from the particular block in the validated text-to-braille blockchain. Specifically, the particular validated braille expression recorded in the particular block may include braille-encoded data that is encoded on a cell-by-cell basis to form a braille-encoded word or a combined sequence of braille-encoded words for the particular validated braille expression.

Finally, the blockchain-based text-to-braille process 700 provides (at 790) the braille-encoded data to a refreshable braille display (RBD) at a terminal operated by the second user, which is configured to decode and physically output the braille expression on the RBD. Then the blockchain-based text-to-braille process 700 ends.

Examples of refreshable braille displays (RBDs) include, without limitation, Perkins-style keyboards, other mechanical or physical devices used to output braille pins to form braille cell letters in sequence for braille expressions, braille note-taker devices, smart braille display devices, etc. In some embodiments, the braille-encoded data expressions are decoded by the RBD or terminal as commands for the RBD to interpret and carry out by outputting the physically touch-readable braille information. For example, a Perkins-style keyboard is a RBD in which small pins are actuated to electronically move up and down through six holes representing each braille cell. Generally, most refreshable braille displays include one or more rows of these cells. However, the number of cells displayed in the row varies for different RBDs. Either way, users can move their fingers across the cells to read the braille pins as if they were reading braille on paper. As reading continues, the pins move up and down (approximately in realtime), reflecting the stream of communications in the expression (from whatever other format that expression originated, e.g., text words input into a computer screen, sign language hand movements in captured video stream, vocal speech expressions, etc.).

Figure 8:
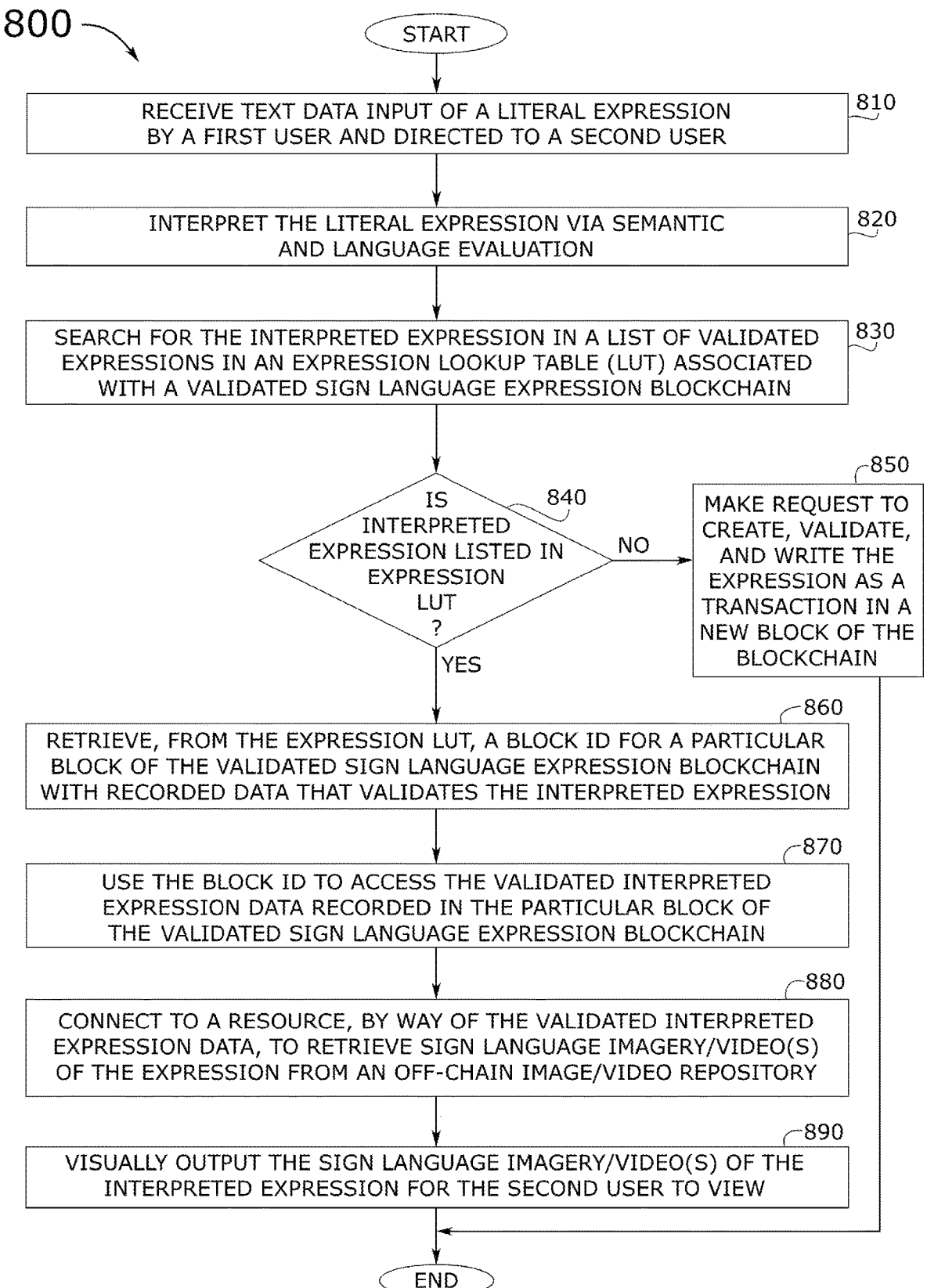
FIG. 8 conceptually illustrates a blockchain-based text-to-sign language process for providing sign language expressions of text in any language in some embodiments.

By way of example, FIG. 8 conceptually illustrates a blockchain-based text-to-sign language process 800 for providing sign language expressions of text in any language in some embodiments. In some embodiments, the blockchain-based text-to-sign language process 800 is performed by a smart contract recorded on a validated text-to-sign language expression blockchain that is utilized for a cross-format text-to-sign language user communication session between different users (e.g., a first user who may or may not have a hearing impairment but nevertheless prefers to communicate in text and a second user who may have a hearing impairment and who prefers to communicate in sign language).

As shown in this figure, the blockchain-based text-to-sign language process 800 starts by receiving text data input of a literal expression by a first user and directed to a second user (at 810) and then interpreting the literal expression by semantic and language evaluation of the expression (at 820). Next, the blockchain-based text-to-sign language process 800 performs a search (at 830) of the expression LUT associated with the validated text-to-sign language blockchain for any entry, among a list of validated expression entries in the expression LUT, with the interpreted expression listed. Based on the search results, the blockchain-based text-to-sign language process 800 determines (at 840) whether the interpreted expression is listed in the expression LUT (and, thus, recorded in the blockchain).

When the interpreted expression is not listed in the expression LUT ('NO'), the blockchain-based text-to-sign language process 800 sends out the request, to authorized nodes of the blockchain, to create and validate a cross-format sign language version of the interpreted text-based expression and to write a transaction block for the cross-format sign language expression in a block of the validated text-to-sign language expression blockchain (at 850). Then the blockchain-based text-to-braille process 700 ends (or rather, continues processing through one of the cross-format translation and interpretation blockchain validating and recording processes, depending on the type of blockchain implementation—either proof-of-work or proof-of-authority—seamlessly transitioning to the start of either the proof-of-work blockchain validation and recording process 200, described above by reference to FIG. 2, or the proof-of-authority blockchain validation and recording process 300, described above by reference to FIG. 3.

Now referring back to the determination (at 840), when the interpreted expression is affirmatively listed in the expression LUT ('YES'), the blockchain-based text-to-sign language process 800 moves forward to a step for retrieving (at 860), from the expression LUT, the block ID of a particular block in the validated text-to-sign language expression blockchain with data for a particular validated sign language expression recorded. Then the blockchain-based text-to-sign language process 800 uses the block ID to access the particular validated sign language expression (at 870). Notably, the data for the particular validated sign language expression recorded on the particular block may be a resource link to an external off-chain repository or other resource that is accessible by way of an external oracle system.

Thus, the blockchain-based text-to-sign language process 800 of some embodiments connects to the resource (at 880) to retrieve sign language imagery, videos, gestures, iconography, animations, GIFs, symbols or other media with sign language data from the off-chain resource. In some embodiments, connecting to the resource (at 880) involves triggering the external oracle system to access the off-chain resource and retrieve the media data with the sign language data for the particular validated sign language expression. Finally, after retrieving the sign language media data, the blockchain-based text-to-sign language process 800 visually outputs (at 890) the sign language of the semantically accurate expression for the second user to view. Then the blockchain-based text-to-sign language process 800 ends.

While the processes described above, by reference to FIGS. 5, 7, and 8, related to cross-format interpretations/translations based on received textual input, the form of communication received in the first case may be another kind, such as audible speech (audio), sign language, or braille. In the next several examples, described below by reference to FIGS. 9-11, the literal expression is received as audio.

Figure 9:
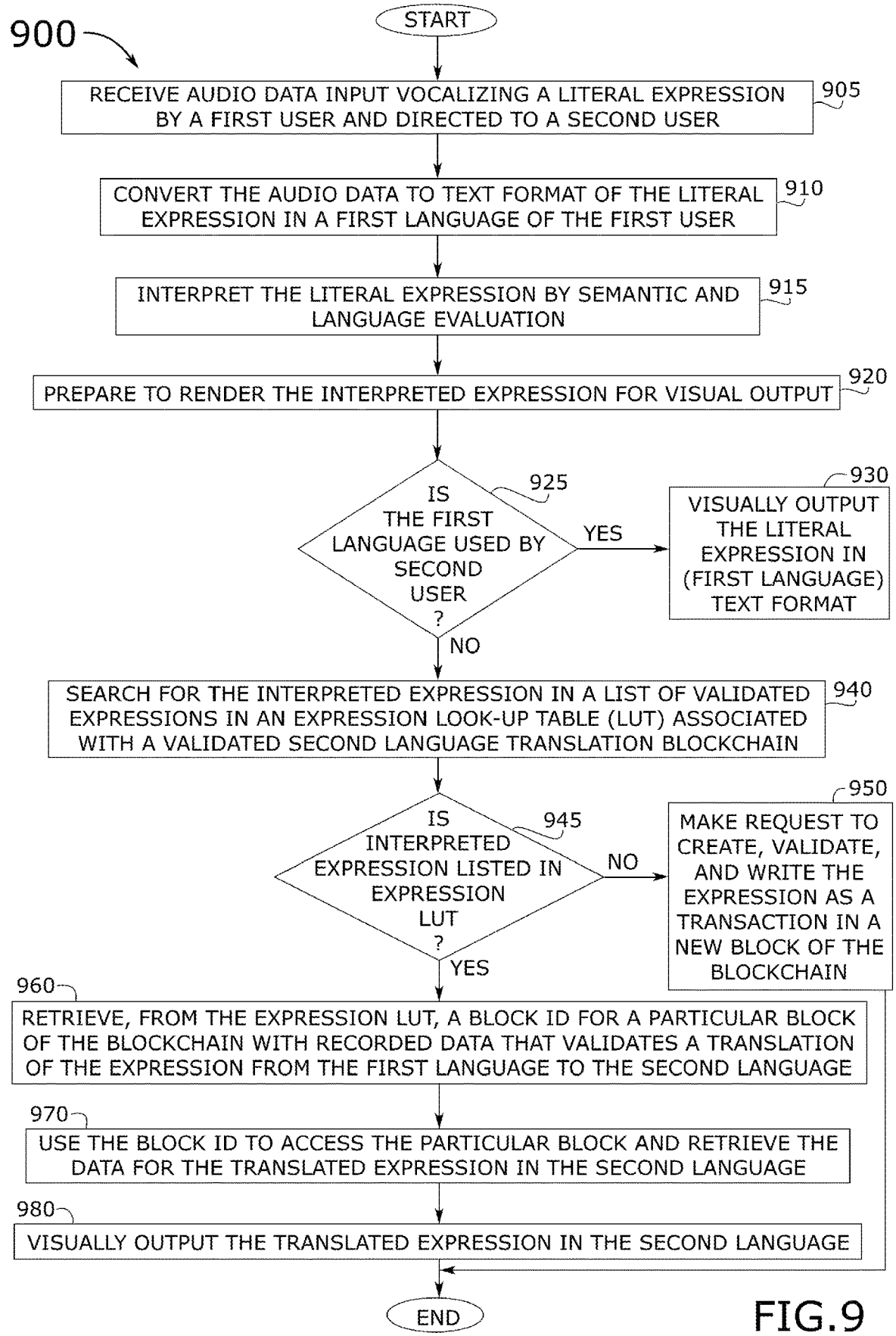
FIG. 9 conceptually illustrates a blockchain-based audio-to-text process for providing text expressions of spoken word audio in any language in some embodiments.

Referring first to FIG. 9, a blockchain-based audio-to-text process 900 for providing text expressions of spoken word audio in any language is conceptually illustrated. In some embodiments, the blockchain-based audio-to-text process 900 is performed by a smart contract recorded on a validated audio-to-text expression blockchain that is utilized for a cross-format audio-to-text user communication session between different users (e.g., a first user who may or may not have a vision impairment yet prefers to communicate in speech/audio form and a second user who may or may not have a hearing impairment but who nevertheless prefers to communicate in written text form).

As shown in this figure, the blockchain-based audio-to-text process 900 starts by receiving audio data input of a literal expression by a first user and directed to a second user (at 905) and converting the audio data to text format of the literal expression in a first language of the first user (at 910). The conversion of audio to text is performed by an existing process.

Next, the blockchain-based audio-to-text process 900 proceeds to a step for interpreting the literal expression by semantic and language evaluation of the text formatted expression (at 915). In some embodiments, the step for interpreting involves those steps of the process for interpreting a literal expression by semantic and language evaluation 600, described above, by reference to FIG. 6.

After interpreting the literal expression, the blockchain-based audio-to-text process 900 moves forward to a step for preparing to render the interpreted expression for visual output in the first language when the first language is used by the second user (at 920). This step would be sufficient even in situations where a variation of the first language is is used by the second user. For example, the first user communicates in American English while the second user communicates in British English. On the other hand, some variations of a core language (e.g., English, Spanish, French, etc.) may be so obtuse as to require a language translation (e.g., Castilian Spanish versus Latin American Spanish). Thus, the blockchain-based audio-to-text process 900 may also prepare to render the interpreted expression for visual output in a second language (different from the first language) when the second user typically prefers or uses the second language (at 920).

Accordingly, the blockchain-based audio-to-text process 900 performs the next step of determining (at 925) whether the first language is actually used (or could be used) by the second user. When the first language is used or can be acceptably used by the second user ('YES'), the blockchain-based audio-to-text process 900 proceeds to visually outputting the interpreted expression in the first language and in text format for the second user to read (at 930). On the other hand, when the first language is not (and cannot be) used by the second user ('NO'), the blockchain-based audio-to-text process 900 then proceeds to a step for searching (at 940) for the interpreted expression among a list of validated expressions in the expression LUT associated with the validated other language translation blockchain (also referred to as the 'validated second language translation blockchain').

Based on the results of the search, the blockchain-based audio-to-text process 900 of some embodiments determines (at 945) whether the interpreted expression is listed in the expression LUT. When the interpreted expression is not listed in the expression LUT, the blockchain-based audio-to-text process 900 proceeds to the step for broadcasting the request to the authorized nodes of the validated other language text expression blockchain to create, validate, and write an interpretation/translation of the expression in text format as a transaction in a new block of the blockchain (at 950). However, when the interpreted expression is affirmatively found to be listed in the expression LUT (YES'), the blockchain-based audio-to-text process 900 then continues forward to a step for retrieving, from the expression LUT, the block ID (at 960) that identifies a particular block in the blockchain with validated translation data of the expression from the first language to the second language. This is followed by the blockchain-based audio-to-text process 900 using the block ID to access the particular block of the blockchain to retrieve the data for the translated expression in the second language (at 970). Then the blockchain-based audio-to-text process 900 visually outputs (at 980) the text form of the translated expression in the second language for the second user to read. Then the blockchain-based audio-to-text process 900 ends.

Figure 10:
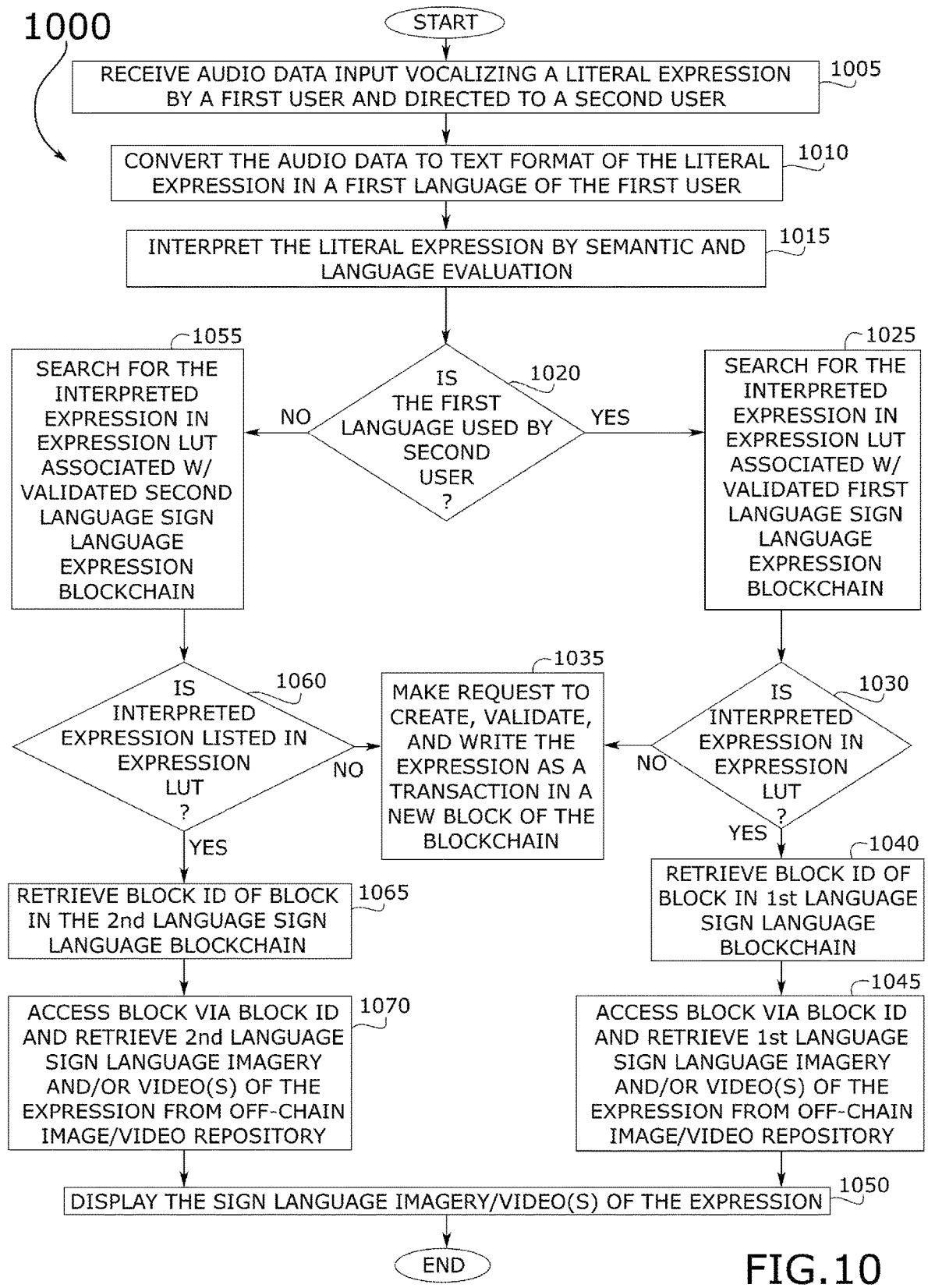
FIG. 10 conceptually illustrates a blockchain-based audio-to-sign language process for providing sign language expressions of audible speech in any language in some embodiments.

Turning to FIG. 10, a blockchain-based audio-to-sign language process 1000 for providing sign language expressions of audible speech in any language is conceptually illustrated. In some embodiments, the blockchain-based audio-to-sign language process 1000 is performed by different smart contracts recorded on different blockchains, namely a validated first language sign language expression blockchain and a validated second language sign language expression blockchain, either of which is utilized for a cross-format audio-to-sign language user communication session between first and second users, depending on whether the first and second users have a common language or use different languages (e.g., a first user who may or may not have a vision impairment yet prefers to communicate in speech format in a preferred language and a second user who may have a hearing impairment and prefers to communicate in sign language, either in the same preferred language or in a different language).

As shown in this figure, the blockchain-based audio-to-sign language process 1000 starts by receiving audio data input of a literal expression vocalized or otherwise audibly expressed by a first user and directed to a second user (at 1005). In some embodiments, the blockchain-based audio-to-sign language process 1000 then converts the received audio data to text format of the literal expression (1010). To convert from audio form to text form the blockchain-based audio-to-sign language process 1000 of some embodiments performs a process for converting audio data of a literal expression to text format of the literal expression. In some embodiments, the process for converting audio data of a literal expression to text format of the literal expression comprises (i) decoding a waveform of the audio data expressed by a first user, (ii) performing sound and speech analysis of the decoded audio waveform to identify a language of the first user, and (iii) rendering, based on the analyzed audio, a text formatted expression in the language of the first user. In some embodiments, the step for performing sound and speech analysis involves the universal language assistive translation and interpretation system invoking an artificial intelligence (AI) expression recognition and natural language processing (NLP) engine. An example of an AI expression recognition and NLP engine is described below, by reference to FIG. 15.

After converting the audio to a text-based version of the literal expression, the blockchain-based audio-to-sign language process 1000 of some embodiments proceeds to the step for interpreting the literal expression by semantic and language evaluation of the text formatted expression (at 1015), which (as noted above) can be completed by performing the steps of the process for interpreting a literal expression by semantic and language evaluation 600, described above by reference to FIG. 6.

Next, the blockchain-based audio-to-sign language process 1000 proceeds forward to a step for determining (at 1020) whether the first language in which the first user expressed the audio expression is used by the second user or not. When the first language is used by the second user ('YES'), the blockchain-based audio-to-sign language process 1000 performs a series of steps starting with searching (at 1025) for the interpreted expression in the expression LUT associated with the validated first language sign language expression blockchain. Then the blockchain-based audio-to-sign language process 1000 determines (at 1030) whether the interpreted expression is listed in the expression LUT associated with the validated first language sign language expression blockchain. When the interpreted expression is not found to be listed in the expression LUT (1\10'), the blockchain-based audio-to-sign language process 1000 proceeds to a step for broadcasting a request to nodes to create, validate, and write the expression as a transaction in a new block of the validated first language sign language expression blockchain (at 1035). However, when the interpreted expression is affirmatively identified in the expression LUT ('YES'), the blockchain-based audio-to-sign language process 1000 then performs a step for retrieving (at 1040) the block ID of the particular block in the validated first language sign language blockchain followed by another step for accessing (at 1045) the particular block via the block ID to retrieve first language sign language imagery or videos of the expression from off-chain image/video/media content resource(s). Then the blockchain-based audio-to-sign language process 1000 proceeds to the final step of displaying the sign language imagery/videos of the expression for the second user to view (at 1050). Then the blockchain-based audio-to-sign language process 1000 ends.

Turning back to the determination of whether the first language is used by the second user (at 1020), when the second user prefers a different language than the first language (1\10'), the blockchain-based audio-to-sign language process 1000 proceeds through a different series of steps starting with searching (at 1055) for the interpreted expression in the expression LUT associated with a validated second language sign language expression blockchain. Then the blockchain-based audio-to-sign language process 1000 performs the step of determining (at 1060) whether the interpreted expression is listed in the expression LUT associated with the validated second language sign language expression blockchain. When the interpreted expression is not listed in the expression LUT associated with the validated second language sign language expression blockchain ('NO'), the blockchain-based audio-to-sign language process 1000 performs the step for broadcasting (at 1035) a request to nodes of the validated second language sign language expression blockchain to create, validate, and write the expression as a transaction in a new block of the validated second language sign language expression blockchain. On the other hand, when the interpreted expression is affirmatively found to be listed in the expression LUT associated with the validated second language sign language expression blockchain ('YES'), the blockchain-based audio-to-sign language process 1000 continues forward to perform steps for retrieving (at 1065) the block ID of the particular block in the validated second language sign language blockchain and then accessing (at 1070) the particular block via the block ID to retrieve second language sign language imagery or videos of the expression from off-chain image/video/media content resource(s). Finally, the blockchain-based audio-to-sign language process 1000 performs the step for displaying (at 1050) the sign language imagery/videos of the expression for the second user to view. Then the blockchain-based audio-to-sign language process 1000 ends.

Figure 11:
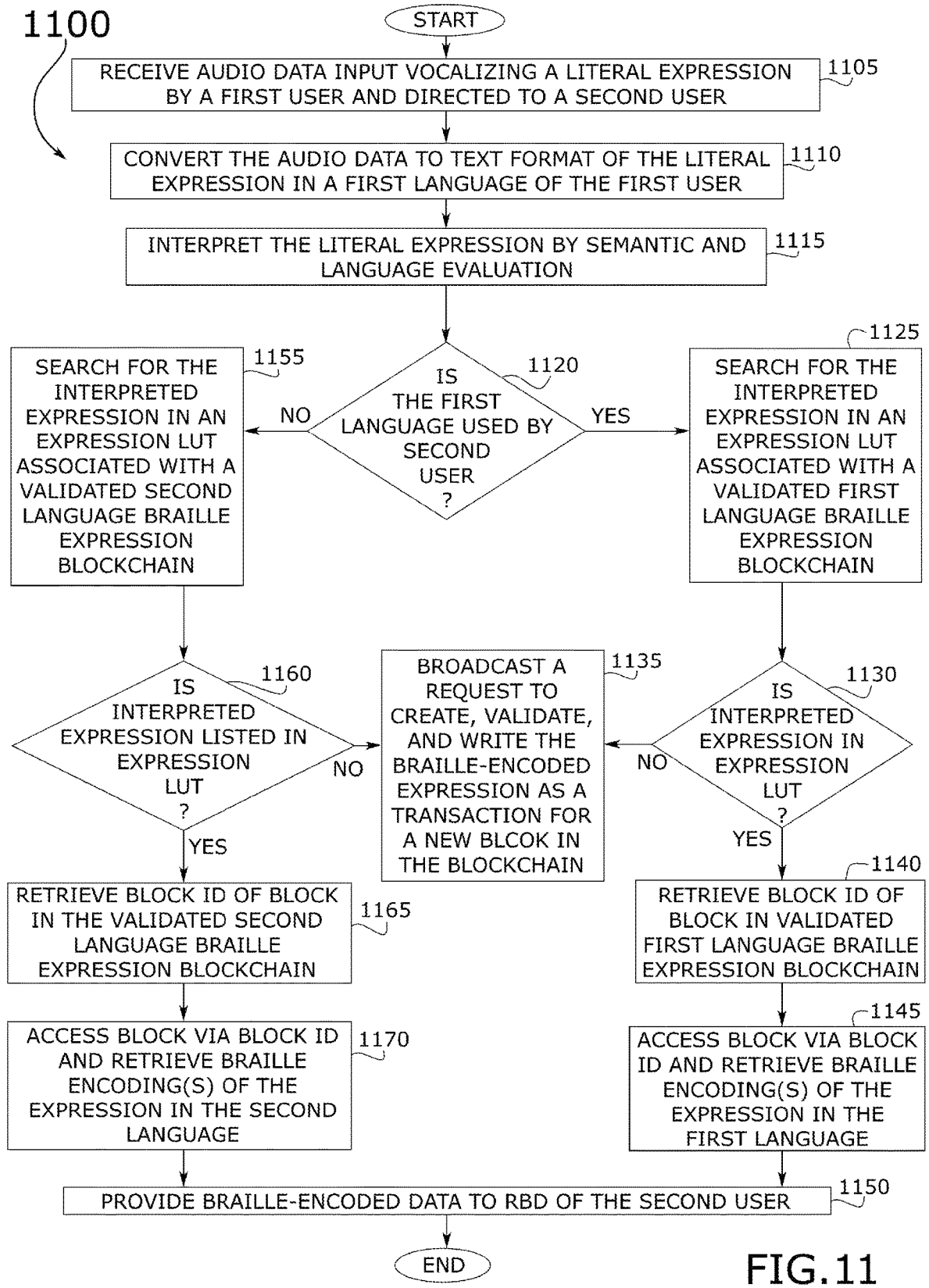
FIG. 11 conceptually illustrates a blockchain-based audio-to-braille process for providing braille-encoded expressions of spoken word audio in any language in some embodiments.

By way of another example, FIG. 11 conceptually illustrates a blockchain-based audio-to-braille process 1100 for providing braille-encoded expressions of spoken word audio in any language in some embodiments. In some embodiments, the blockchain-based audio-to-braille process 1100 is performed by different smart contracts recorded on different blockchains, namely, a validated first language braille expression blockchain and a validated second language braille expression blockchain, either of which is utilized for a cross-format audio-to-braille user communication session between first and second users, depending on whether the first and second users have a common language or use different languages (e.g., a first user who may or may not have a vision impairment yet prefers to communicate in speech/audio format in a preferred language and a second user who may have a vision impairment and therefore prefers to communicate in braille, either in the same preferred language or in a different language).

As shown in this figure, the blockchain-based audio-to-braille process 1100 starts by receiving audio data input of a literal expression vocalized or otherwise audibly expressed by a first user and directed to a second user (at 1105) and then converting the audio data to text format of the literal expression of the first user (at 1100). Converting the audio form to text form is performed as described above, by reference to the audio-to-text conversion step (at 1010) of the blockchain-based audio-to-sign language process 1000 in FIG. 10.

Next, the blockchain-based audio-to-braille process 1100 performs a step for interpreting the literal expression by semantic and language evaluation of the text formatted expression (at 1115), which may be performed via the process for interpreting a literal expression by semantic and language evaluation 600, described above by reference to FIG. 6.

After interpreting the literal expression semantically and for language evaluation, the blockchain-based audio-to-braille process 1100 performs the step of determining (at 1120) whether the first language is used by the second user. When the first language is affirmatively used by the second user ('YES'), the blockchain-based audio-to-braille process 1100 performs a series of steps starting with searching (at 1125) for the interpreted expression in an expression LUT associated with the validated first language braille expression blockchain. Then the blockchain-based audio-to-braille process 1100 determines (at 1130) whether, during the search, the interpreted expression was found to be listed in the expression LUT associated with the validated first language braille expression blockchain. When the interpreted expression was not found in the expression LUT ('NO'), the blockchain-based audio-to-braille process 1100 proceeds to a step for broadcasting a request to authorized nodes of the validated first language braille expression blockchain to create, validate, and write the expression as a transaction in a new block of the validated first language braille expression blockchain (at 1135). On the other hand, when the interpreted expression is affirmatively identified during the search in the expression LUT ('YES'), then the blockchain-based audio-to-braille process 1100 moves forward to a step for retrieving (at 1140) the block ID of the particular block in the validated first language braille blockchain followed by another step for accessing (at 1145) the particular block via the block ID to retrieve first language braille-encoded data of the expression in the first language. Then the blockchain-based audio-to-braille process 1100 performs the final step of providing the braille-encoded data for the expression to a RBD operated by the second user for physical output of the braille expression in the first language (at 1150). Then the blockchain-based audio-to-braille process 1100 ends.

When the second user is determined (at 1120) not to use the first language ('NO'), the blockchain-based audio-to-braille process 1100 then proceeds through a different series of steps starting with searching (at 1155) for the interpreted expression in the expression LUT associated with the validated second language braille expression blockchain. Then the blockchain-based audio-to-braille process 1100 performs the step of determining (at 1160) whether the interpreted expression is listed in the expression LUT associated with the validated second language braille expression blockchain. When the interpreted expression is not listed in the expression LUT associated with the validated second language braille expression blockchain ('NO'), the blockchain-based audio-to-braille process 1100 performs the step of broadcasting (at 1135) a request to authorized nodes of the validated second language braille expression blockchain to create, validate, and write the braille-encoded expression as a transaction in a new block of the validated second language braille expression blockchain. On the other hand, when the interpreted expression is affirmatively found to be listed in the expression LUT associated with the validated second language braille expression blockchain ('YES'), the blockchain-based audio-to-braille process 1100 simply continues forward to perform steps for retrieving (at 1165) the block ID of the particular block in the validated second language braille blockchain and then accessing (at 1170) the particular block via the block ID to retrieve second language braille-encoded data of the expression from the particular block. Finally, the blockchain-based audio-to-braille process 1100 performs the step of providing the braille-encoded data of the expression to a RBD operated by the second user for physical output of the braille expression in the second language (at 1150). Then the blockchain-based audio-to-braille process 1100 ends.

Figure 12:
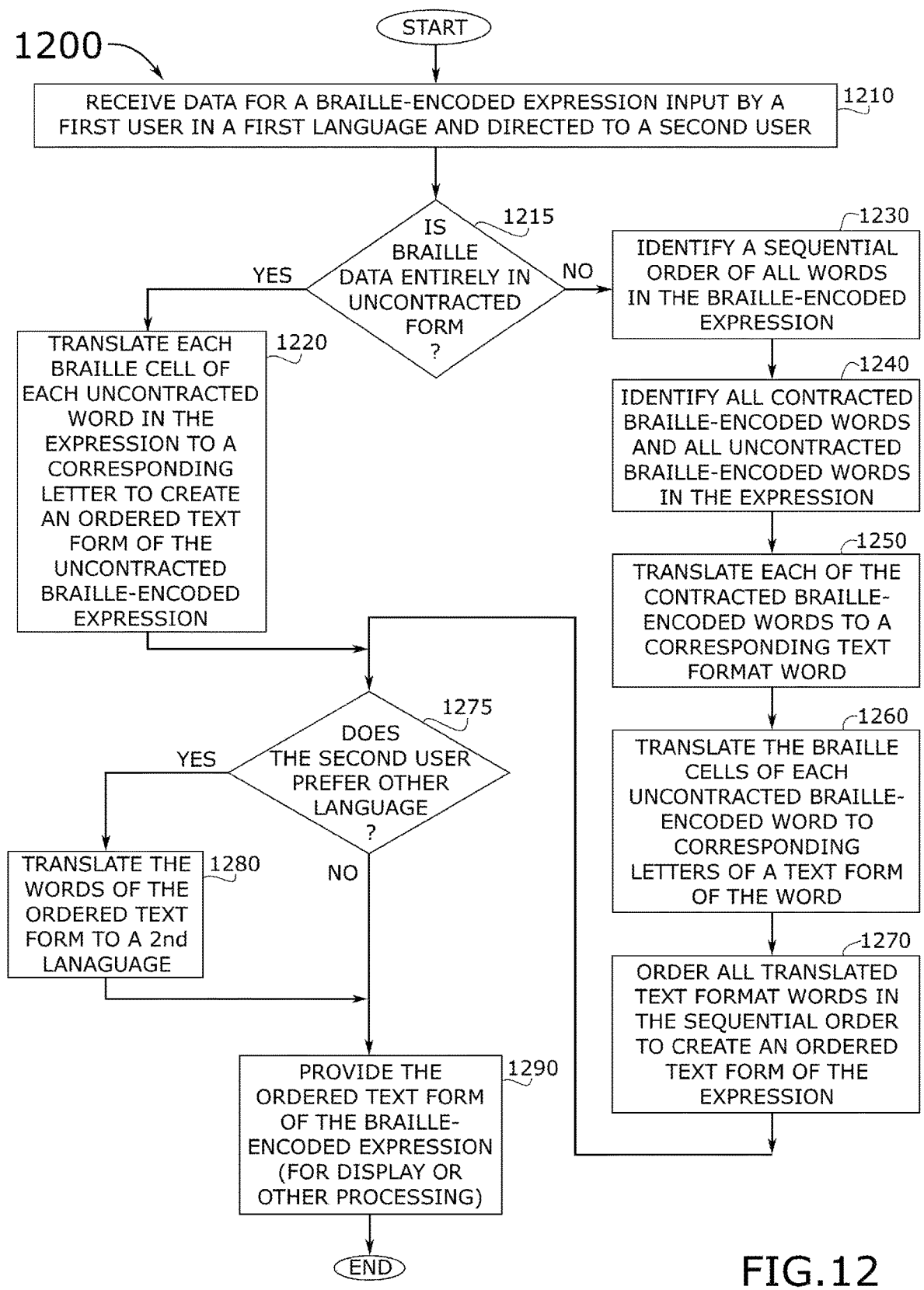
FIG. 12 conceptually illustrates braille-to-text process for providing an ordered text form of a braille-encoded expression in some embodiments.

In another example, FIG. 12 conceptually illustrates a braille-to-text process 1200 for providing an ordered text form of a braille-encoded expression in some embodiments. As shown in this figure, the braille-to-text process 1200 starts by receiving, via a refreshable braille display (RBD), data input of a braille-encoded expression by a first user in a first language and directed to a second user (at 1210). The RBD may be any type of braille display, such as a Perkins style braille keyboard or other smart braille output device. Next, the braille-to-text process 1200 determines (at 1215) whether the braille-encoded data is expressed entirely in non-contracted (or uncontracted) form or not. When the braille-encoded data is affirmatively expressed entirely in non-contracted form, the braille-to-text process 1200 of some embodiments translates (at 1220) each braille cell (of the braille-encoded expression) to a corresponding letter to create an ordered text form of the non-contracted braille-encoded expression in the first language. After translating each of the braille cells (at 1220), the braille-to-text process 1200 determines (at 1275) whether the second user prefers using another language (a so-called 'second language') over the first language.

On the other hand, when the braille-encoded data of the expression is not entirely in uncontracted form, then the braille-to-text process 1200 considers the expression to be a contracted braille-encoded expression that is at least partially formed of braille contraction words. As such, the braille-to-text process 1200 proceeds through a series of steps starting with identifying a sequential order of all words in the contracted braille-encoded expression (at 1230). After the sequential order is identified, the contracted braille-encoded expression performs a step for evaluating all the words in the contracted braille-encoded expression and identifying (at 1240) all of contracted braille-encoded words and all of the non-contracted braille-encoded words (if any). Then the braille-to-text process 1200 moves on to the next step for translating (at 1250) each contracted braille-encoded word to a text format word in the first language (that is may or may not be in a contracted text form, e.g., "cannot" versus "can't", or "do not" versus "don't", etc.), followed by translating (at 1260) the braille cells of each non-contracted braille-encoded word to corresponding letters of a text format of the word in the first language. Then the braille-to-text process 1200 continues this series of steps by ordering (at 1270) all of the translated text format words in the sequential order to create an ordered text form of the contracted braille-encoded expression in the first language. After this step, the braille-to-text process 1200 proceeds to perform the step (noted above) for determining (at 1275) whether the second user prefers using second language over the first language.

When the second user is determined (at 1275) not to prefer another language to the first language ('NO'), then the braille-to-text process 1200 moves forward to a step for providing (at 1290) the ordered text form of the braille-encoded expression for display for second user to read or for other processing as needed. On the other hand, when the second user is affirmatively determined (at 1275) to prefer using the second language over the first language ('YES'), the braille-to-text process 1200 transitions to a step for translating (at 1280) the words of the ordered text form (arising from either the non-contracted or contracted expressions) to the second language preferred by the second user. After completing the translation step (at 1280), the braille-to-text process 1200 then continues forward to the step for providing (at 1290) the ordered text form of the braille-encoded expression for display for second user to read or for other processing as needed. Then the braille-to-text process 1200 ends.

Figure 13:
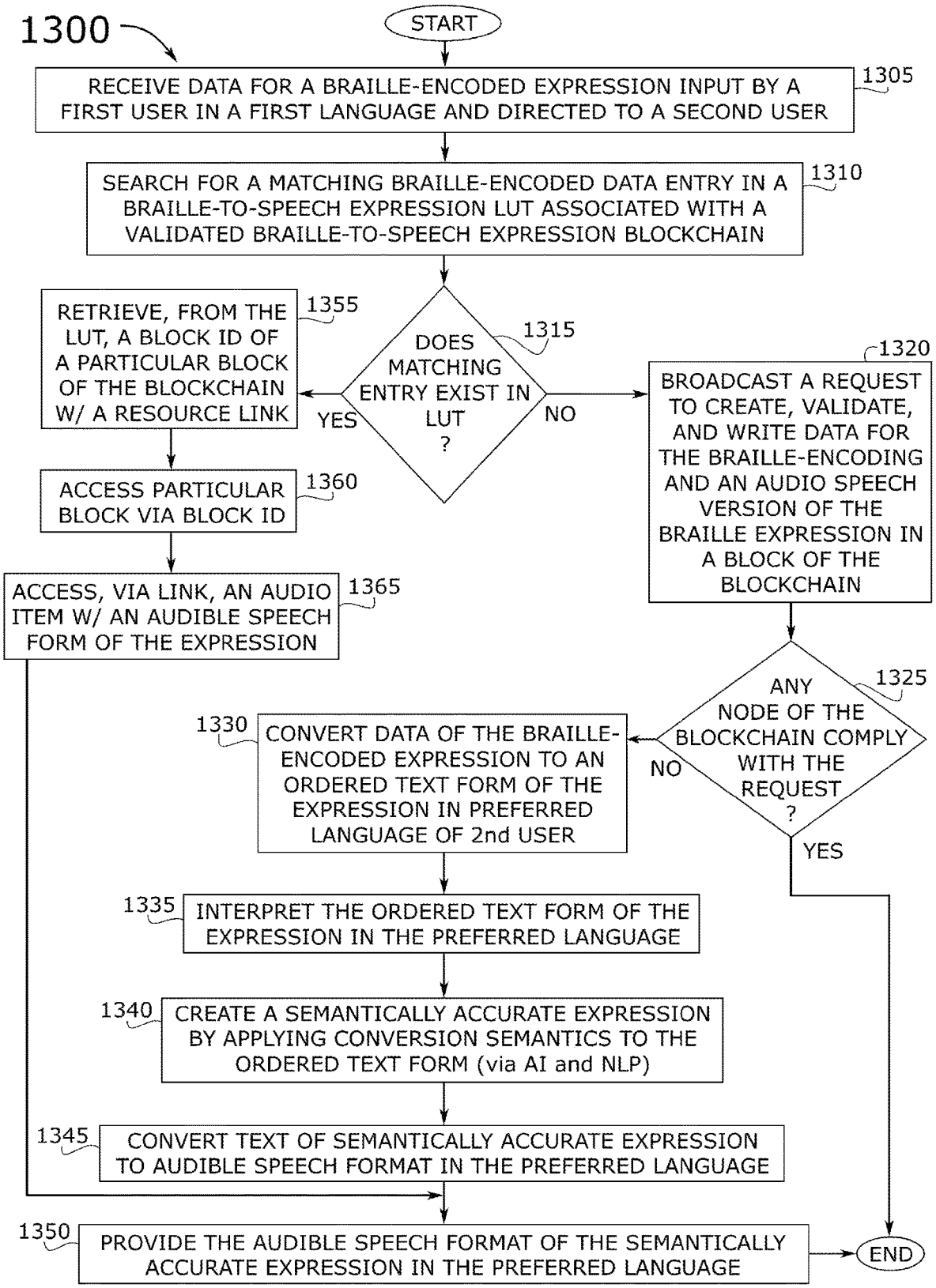
FIG. 13 conceptually illustrates a blockchain-based braille-to-audio process for providing spoken audio of braille-encoded expressions in any language in some embodiments.

Now referring to FIG. 13, a blockchain-based braille-to-audio process 1300 is shown which provides spoken audio of braille-encoded expressions in any language in some embodiments. In some embodiments, the blockchain-based braille-to-audio process 1300 is performed by a smart contract recorded on a validated braille-to-audio expression blockchain that is utilized for a cross-format braille-to-audio user communication session between different users (e.g., a first user who may have a vision impairment and prefers to communicate in braille and a second user who may or may not have a vision impairment but who prefers to communicate in speech/audio).

As shown in this figure, the blockchain-based braille-to-audio process 1300 starts by receiving, via a RBD (such as a Perkins style braille keyboard), data input of a braille-encoded expression by a first user in a first language and directed to a second user (at 1305). The blockchain-based braille-to-audio process 1300 then performs a step for searching, on a braille cell-by-braille cell sequential manner, for a matching braille-encoded data entry in a braille-to-speech expression LUT associated with a validated braille-to-speech expression blockchain (at 1310). Then the blockchain-based braille-to-audio process 1300 determines (at 1315) whether a matching braille-encoded data entry is found in the braille-to-speech expression LUT or not. When a matching braille-encoded data entry is found in the braille-to-speech expression LUT, then it is an indication that the braille-encoded data is recorded in the validated braille-to-speech expression blockchain. Thus, if the search does not find a matching braille-encoded data entry in the braille-to-speech expression LUT ('NO'), then the blockchain-based braille-to-audio process 1300 proceeds to the step for transmitting (or broadcasting) to authorized nodes of the validated braille-to-speech expression blockchain a request to create, validate, and write the braille-encoded data and a cross-format audio speech version of the braille-encoded expression in a block of the validated braille-to-speech expression blockchain. In some embodiments, the blockchain-based braille-to-audio process 1300 determines (at 1325) whether any node has complied with the broadcast request. When at least one node is determined (at 1325) to have complied with the broadcast request (at 1320), the blockchain-based braille-to-audio process 1300 ends. Of course, as noted above, instead of truly 'ending', the responding authorized node would carry out operations commensurate with the steps of one of the validation and recording processes, either the proof-of-work blockchain validation and recording process 200, described above by reference to FIG. 2, or the proof-of-authority blockchain validation and recording process 300, described above by reference to FIG. 3.

On the other hand, when no authorized node is determined (at 1325) to have complied with the broadcast request (at 1320), then the blockchain-based braille-to-audio process 1300 proceeds through several steps starting with a step for converting the data of the braille-encoded expression to an ordered text form of the expression in a preferred language of the second user (at 1330). This converting step (at 1330) may involve several steps, such as the steps of the braille-to-text process 1200, described above by reference to FIG. 12.

Next, the blockchain-based braille-to-audio process 1300 of some embodiments interprets the ordered text form of the expression in the preferred language of the second user (at 1335) and then creating a semantically accurate expression (at 1340) by applying conversion semantics to the ordered text form of the interpreted expression. In some embodiments, conversion semantics are applied to the ordered text form of the expression by the AI expression recognition and NLP engine, which is further described below, by reference to FIG. 15. In some embodiments, the conversion semantics are applied to the ordered text form of the expression based on the interpretation and accepted language constructs of the preferred language. After the semantically accurate expression is produced by application of conversion semantics to the interpretation and the accepted language constructs, the blockchain-based braille-to-audio process 1300 proceeds forward to a step for converting text of the semantically accurate expression to an audible speech format in the preferred language (at 1345). In some embodiments, the step for converting the text to audible speech is performed in connection with the AI expression recognition and NLP engine, described in further detail below, by reference to FIG. 15. Next, the blockchain-based braille-to-audio process 1300 proceeds to a final step of providing the audible speech format of the semantically accurate expression in the preferred language to the second user (at 1350). The audible speech format may be in any audible form including, without limitation, as an audio clip, an audio stream, etc., which the second user may audibly output through audio speakers, headphones, or other audio output devices.

Now turning back to the determination (at 1315), when the matching braille-encoded data entry affirmatively exists in the braille-to-speech expression LUT ('YES'), then instead of proceeding through steps 1320-1345, described above, the blockchain-based braille-to-audio process 1300 continues forward through a different series of steps starting with retrieving, from the braille-to-speech expression LUT, the block ID corresponding to a particular validated braille-encoded expression recorded in a particular block of the validated braille-to-speech expression blockchain (at 1355). Notably, the particular block identified by the block ID may include a resource link that is associated with an off-chain resource or repository from which an external oracle system may be utilized to retrieve the associated audio format data (e.g., audio clip, audio file, etc.) of the braille-encoded expression. This is described above, and pertains to the following steps in which the blockchain-based braille-to-audio process 1300 uses the block ID to access the particular block in the validated braille-to-speech expression blockchain (at 1360) and then carries out a step for accessing the resource link in the particular block to retrieve the audio speech version of the braille-encoded expression (at 1365). After the audio speech version of the braille-encoded expression is obtained, the blockchain-based braille-to-audio process 1300 proceeds to the final step of providing the audible speech format of the semantically accurate expression in the preferred language to the second user (at 1350), thereby letting the second user to listen to the audio of the expression that originated as braille-encoded data input by the first user. Then the blockchain-based braille-to-audio process 1300 ends.

Figure 14:
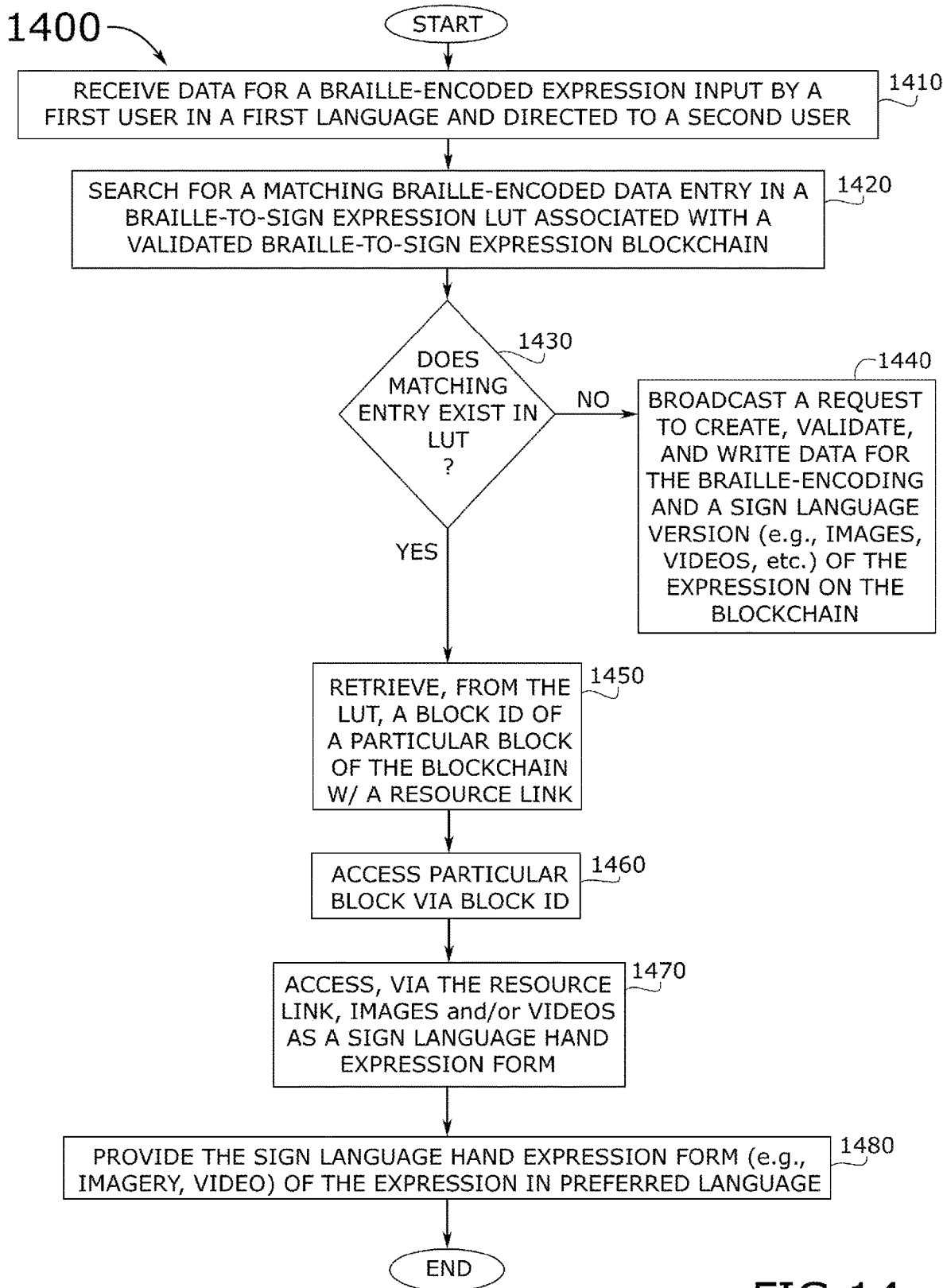
FIG. 14 conceptually illustrates a blockchain-based braille-to-sign language process for providing spoken sign language interpretations of braille-encoded expressions in any language in some embodiments.

In yet another example, FIG. 14 conceptually illustrates a blockchain-based braille-to-sign language process 1400 for providing spoken sign language interpretations of braille-encoded expressions in any language in some embodiments. In some embodiments, the blockchain-based braille-to-sign language process 1400 is performed by a smart contract recorded on a validated braille-to-sign language expression blockchain that is utilized for a cross-format braille-to-sign language user communication session between different users (e.g., a first user who may have a vision impairment and prefers to communicate in braille and a second user who may have a hearing impairment and who prefers to communicate in sign language).

As shown in this figure, the blockchain-based braille-to-sign language process 1400 starts by receiving data input of a braille-encoded expression by a first user in a first language and directed to a second user (at 1410) and then searching for a matching braille-encoded data entry in a braille-to-sign expression LUT associated with the validated braille-to-sign expression blockchain (at 1420). Then the blockchain-based braille-to-sign language process 1400 determines (at 1430) whether a matching braille-encoded data is found, during the search, in the braille-to-sign expression LUT. In some embodiments, when no matching braille-encoded data is found in the braille-to-sign expression LUT ('NO'), the blockchain-based braille-to-sign language process 1400 proceeds to a step for broadcasting to authorized nodes of the validated braille-to-sign expression blockchain (at 1440) a request to create, validate, and write in a block of the validated braille-to-sign expression blockchain, a cross-format sign language version of the braille-encoded expression.

However, when a matching braille-encoded data entry is affirmatively discovered during the search (at 1420) of the braille-to-sign expression LUT ('YES'), then the blockchain-based braille-to-sign language process 1400 transitions to a series of steps that start with retrieving a block ID from the braille-to-sign expression LUT (at 1450). In some embodiments, the block ID is a data point adjacent to the matching braille-encoded data entry in the braille-to-sign expression LUT and is easily retrieved once the matching braille-encoded data entry is found during the search (at 1420). Also, the block ID corresponds to a particular validated braille-to-sign expression recorded in a particular block of the validated braille-to-sign expression blockchain wherein the particular validated braille-to-sign expression is considered to be a sign language equivalent of the braille-encoded expression.

After the retrieving the block ID (at 1450), the blockchain-based braille-to-sign language process 1400 transitions to a step for accessing the particular via the block ID (at 1460). From the particular, the blockchain-based braille-to-sign language process 1400 then performs the step for accessing (at 1470) images and/or videos demonstrating the expression in sign language hand expression form. In some embodiments, to access such images/videos which are stored in off-chain repositories, the blockchain-based braille-to-sign language process 1400 triggers an external oracle system to carry out the function of following the resource link and retrieving the corresponding images/videos of the sign language hard expression form. Then the blockchain-based braille-to-sign language process 1400 proceeds to the final step of providing the sign language hand expression form to the second user in the preferred language (at 1480). Then the blockchain-based braille-to-sign language process 1400 ends.

In some embodiments, the blockchain-based universal language assistive translation and interpretation system provides a translator artificial intelligence (AI) and machine learning (ML) system to translate text or voice into sign language and vice versa in realtime and within virtual worlds (e.g., video games, other immersive digital environments, metaverse, etc.). An example of a blockchain-based universal language assistive translation and interpretation system that implements an AI/ML system is described next, by reference to FIGS. 15 and 16.

Figure 15:
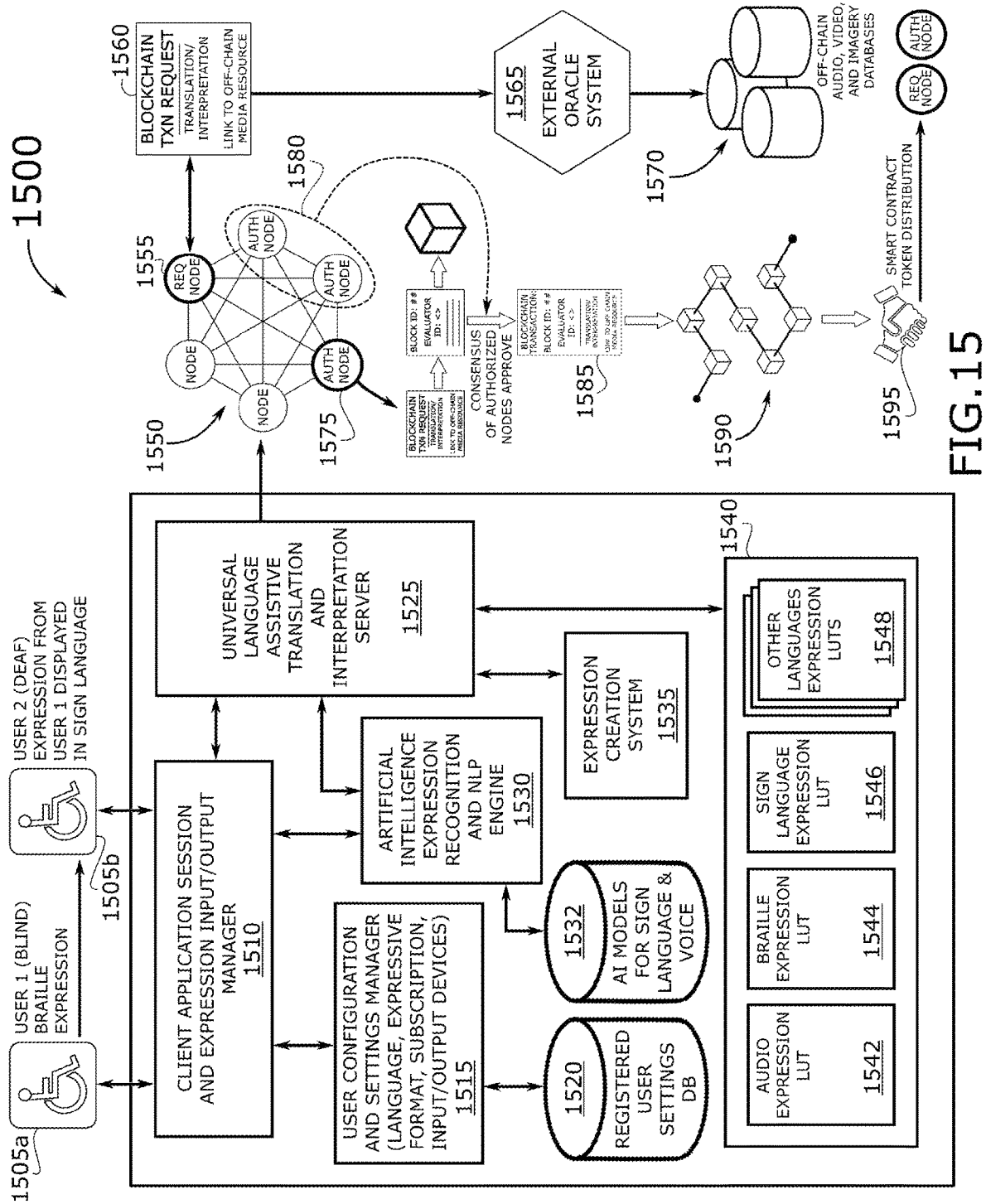
FIG. 15 conceptually illustrates a universal language assistive translation and interpretation system in some embodiments that verifies and validates translations and interpretations of expressions in various forms to corresponding expressions in other forms by smart contract and blockchain technology.

Specifically, FIG. 15 conceptually illustrates a universal language assistive translation and interpretation system 1500 that verifies and validates translations and interpretations of expressions in various forms to corresponding expressions in other forms by smart contract and blockchain technology. As shown in this figure, the universal language assistive translation and interpretation system 1500 comprises a universal language assistive translation and interpretation server 1525, an AI expression recognition and NLP engine 1530, a client application session and expression input/output manager 1510 (hereinafter referred to as the "client session manager 1510"), a user configuration and settings manager 1515, a registered user settings database 1520, an AI-models-for-sign-language-and-audio/voice-expression database 1532, an expression creation system 1535, a plurality of LUTs 1540, an exemplary consensus approved and validated interpretation/translation transaction 1585, at least one blockchain implementation 1590 and at least one corresponding smart contract 1595, a plurality of nodes 1550, a blockchain transaction request 1560, an external oracle system 1565 that is configured to interact with resources outside of the blockchain 1590, and a plurality of off-chain content databases 1570. The plurality of nodes 1550 comprise passive user nodes, contributor nodes 1555, authorized nodes 1575, and a consensus of authorized nodes 1580. The plurality of LUTs 1540 shown in this figure comprise an audio expression LUT 1542, a braille expression LUT 1544, a sign language expression LUT 1546, and language expression LUTs 1548. However, the plurality of LUTs 1540 is not limited to only these LUTs 1542-1548 but is inclusive of all other LUTs described above, by reference to FIGS. 5-14. Thus, the plurality of LUTs 1540 is understood to include all expression LUTs such as the braille-to-sign expression LUT, the audio-to-sign language LUT, the audio-to-braille LUT, etc.

In this figure, a first user 1505*a* and a second user 1505*b* are demonstrated to be interacting with the universal language assistive translation and interpretation system 1500. In this example, the first user 1505*a* has a vision impairment and communicates in braille-encoded expressions to the second user 1505*b*, who has a hearing impairment and prefers to receive (and likely provide) expressions in sign language. The users 1505*a* and 1505*b* operate their own devices to engage in cross-format communication through a client application which, when connected to the universal language assistive translation and interpretation system 1500, provides a cross-format communication channel that is managed by the client session manager 1510 and connects the first user 1505*a* and the second user 1505*b* together (either exclusively or non-exclusively, allowing other users to join). The cross-format communication channel may be integrated into another digital environment in which the users 1505*a* and 1505*b* wish to interact, such as a chat application, a virtual world environment, a metaverse, a gaming environment, etc.

The client session manager 1510 is configured to maintain cross-format communication channels for user communication sessions, handle user authentication and subscription registration (in connection with the user configuration and settings manager 1515 and the registered user settings database 1520), receive expressions communicated by the users in the cross-format communication channel, and route the expressions to the universal language assistive translation and interpretation server 1525 for processing. The client session manager 1510 is further configured to route certain expressions directly to the AI expression recognition and NLP engine 1530 for processing. When a user communicates an expression to a receiving user, the client session manager 1510 receives the expression and bundles the expression together with the language preference of the user, the expressive format preference of the user, the language preference of the receiving user, and the expressive format preference of the receiving user (collectively referred to as the "bundled expression"). Then the client session manager 1510 provides the bundled expression to the universal language assistive translation and interpretation server 1525 for processing.

The user configuration and settings manager 1515 is responsible for managing user registration and subscriptions (if required), user device configuration settings, user language preferences, and user expressive format preferences (collectively referred to as "user configuration and settings"). The user configuration and settings manager 1515 stores the user configuration and settings of each individual user in the registered user settings database 1520. The user configuration and settings of each user are stored in the registered user settings database 1520 separately from the user configuration and settings of all other users.

The universal language assistive translation and interpretation server 1525 is configured to receive bundled expressions from the client session manager 1510 for realtime processing. For example, in a preferred language (e.g., English) the first user 1505*a* may communicate an expression (e.g., "Hello") in braille to the second user 1505*b*. The second user 1505*b* may have a different language preference (e.g., French) and, as noted above, prefers to receive expressive communications in sign language (in this case, French sign language, referred to in short as "LSF"). Given these user configuration and settings for the first user 1505*a* and the second user 1505*b*, the bundled expression received from the client session manager 1510 would include braille-encoded data for the word "Hello", a language preference of English for the first user 1505*a*, an expressive format preference of a refreshable braille display for the first user 1505*a*, a language preference of French for the second user 1505*b*, and an expressive format preference of a visual display device configured to output sign language for the second user 1505*b*. Accordingly, the universal language assistive translation and interpretation server 1525 processes these data points from the bundled expression in order to determine whether a validated sign language interpretation/translation of the braille-encoded word "Hello" is recorded in a particular blockchain implementation—specifically, the validated braille-to-sign expression blockchain. In doing so, the universal language assistive translation and interpretation server 1525 may trigger execution of the corresponding smart contract for the particular blockchain implementation, which itself may execute various operations on a conditional basis.

Also, the universal language assistive translation and interpretation server 1525 accounts for the difference in language preferences between the first user 1505*a* and the second user 1505*b*. In this case, English to French. This is described further below, in connection with the AI expression recognition and NLP engine 1530.

Language translation aside (assuming the translation from English to French is completed), the universal language assistive translation and interpretation server 1525 can quickly ascertain whether the braille-encoded word "Hello" (as translated to French) is recorded in the blockchain by selecting the braille-to-sign expression LUT from the plurality of LUTs 1540 and searching the braille-to-sign expression LUT for a matching braille-encoded data entry of the expression. If the braille-encoded data entry of the expression is found in the braille-to-sign expression LUT, the universal language assistive translation and interpretation server 1525 (which itself is a node of the validated braille-to-sign expression blockchain) retrieves the corresponding block ID (next to the braille-encoded data entry in the LUT) and uses the block ID to access the corresponding block of the validated braille-to-sign expression blockchain. Given that the second user prefers sign language output of expressions, the particular block may include a resource link to one of the off-chain content databases 1570. Therefore, the universal language assistive translation and interpretation server 1525 requests the external oracle system 1565 to retrieve the corresponding sign language imagery/symbols/videos/GIFs/gestures from the off-chain content database 1570. When received from the external oracle system 1565, the universal language assistive translation and interpretation server 1525 provides the sign language imagery/symbols/videos/GIF s/gestures to the client session manager 1510 which transmits the same to a visual display device operated by the second user 1505*b*.

The AI expression recognition and NLP engine 1530 provides intelligent processing of expressions to derive semantic meaning of literal expressions and to perform various conversions, translations, audio processing, video/image processing, and other intelligent processing. The AI expression recognition and NLP engine 1530 may be employed to generate interpretations/translations of expressions when no authorized node responds to a request from the universal language assistive translation and interpretation server 1525 to create, validate, and write (or add) data for a particular interpretation/translation of an expression that is presently not recorded in the blockchain. And as noted above, the universal language assistive translation and interpretation server 1525 may call on the AI expression recognition and NLP engine 1530 to provide a language translation. When called, the AI expression recognition and NLP engine 1530 processes the bundled expression for translation, as well as semantic interpretation according to accepted language standards of each respective language. In some embodiments, the AI expression recognition and NLP engine 1530 may perform this translation processing with an AI model from the AI-models-for-sign-language-and-audio/voice-expression database 1532.

The expression creation system 1535 is configured for access by authorized nodes to create content that may serve for a particular interpretation/translation of an expression to record on the blockchain 1590. As noted above, nodes/users may utilize their own content creation technology to create symbols, animations, GIFs, drawings, iconography, etc., for sign language representations, or capture videos of their own hand movements with their own device cameras to create the sign language representations. However, authorized nodes/users may optionally connect to the universal language assistive translation and interpretation system 1500 and access (via the universal language assistive translation and interpretation server 1525) the expression creation system 1535 to create such symbols, animations, GIF s, drawings, iconography, etc., for sign language representations. Furthermore, when using any technology that uses a camera device to capture sign language hand motions, the expression creation system 1535 feeds the captured video data/imagery back to the universal language assistive translation and interpretation server 1525, which then transmits the captured video data/imagery to the AI expression recognition and NLP engine 1530 for processing by a deep learning algorithm (which runs as a software unit on the AI expression recognition and NLP engine 1530). The intention of the deep learning processing is to match each hand movement/gesture in the captured video/imagery to a particular sign and a relevant word.

The passive nodes in the plurality of nodes 1550 may be end-user nodes, such as the devices operated by the first user 1505*a* and the second user 1505*b*, who merely engage in cross-format communication, but who do not provide or validate cross-format interpretations/translations of expressions. On the other hand, the contributor nodes 1555 (or "requesting nodes 1555") provide cross-format interpretations/translations of expressions. Each cross-format interpretation/translation of an expression is provided by the requesting node 1555 as blockchain transaction request 1560. The authorized nodes 1575 (or "trusted evaluator nodes 1575") receive the blockchain transaction requests 1560 to review the associated cross-format interpretations/translations of expressions. The authorized nodes 1575 also validate the accuracy of the cross-format interpretations/translations of the expressions when the accuracy sufficiently warrants validation. In proof-of-authority blockchain implementations, the consensus of authorized nodes 1580 is required before the authorized nodes 1575 may write transaction blocks with the validated cross-format interpretations/translations of expressions in the blockchain 1590. In this way, each consensus approved and validated interpretation/translation transaction 1585 gets added as a block to the blockchain 1590. Each node—both requesting nodes 1555 and trusted evaluator nodes 1575—also maintains a log with copies of their blockchain transactions. However, in some embodiments, each blockchain transaction with an interpretation/translation offered by a requesting node 1555 remains in a pending state until approval by a trusted evaluator node 1575 (and, in a proof-of-authority blockchain implementation, approval by a consensus of other authorized nodes 1580 of the trusted evaluator node's review of the interpretation/translation). In some embodiments, each node (both the contributor node 1555 who provided the interpretation/translation work and the trusted evaluator node 1575 who reviewed the work of the contributor node 1555) receive a reward, in the form of a token, for their respective work. On the other hand, if the trusted evaluator node 1575 rejects the interpretation/translation provided by the contributor node 1555, then the transaction is not recorded on the blockchain 1590 and each node may discard (not store their own) the failed transaction. Furthermore, contributor nodes 1555 only receive tokens when their cross-format interpretations/translations are validated by a trusted evaluator node 1575 (and subsequently approved by a consensus of authorized nodes 1580), while the trusted evaluator node 1575 receives a token for reviewing the work of a contributor node 1555, whether the cross-format interpretation/translation of an expression is validated or rejected. In some embodiments, the trusted evaluator node 1575 only receives a token for reviewing the work of a contributor node 1555 (whether the cross-format interpretation/translation of an expression is validated or rejected) when the consensus of authorized nodes 1580 approves the validation of accuracy or rejection of accuracy of the cross-format interpretation/translation of the expression.

The smart contract 1595 operates on conditions that trigger various execution of functions and operations. For instance, the smart contract 1595 is triggered to automatically distribute tokens to both (i) the requesting node 1555 who provided the work in preparing the cross-format interpretation/translation of the expression and (ii) the authorized node 1575 who had the proof-of-authority to perform the work of reviewing the cross-format interpretation/translation of the expression for accuracy (which was submitted to the consensus of authorized nodes 1580 to approve, before the block is written to the blockchain 1590).

Figure 16:
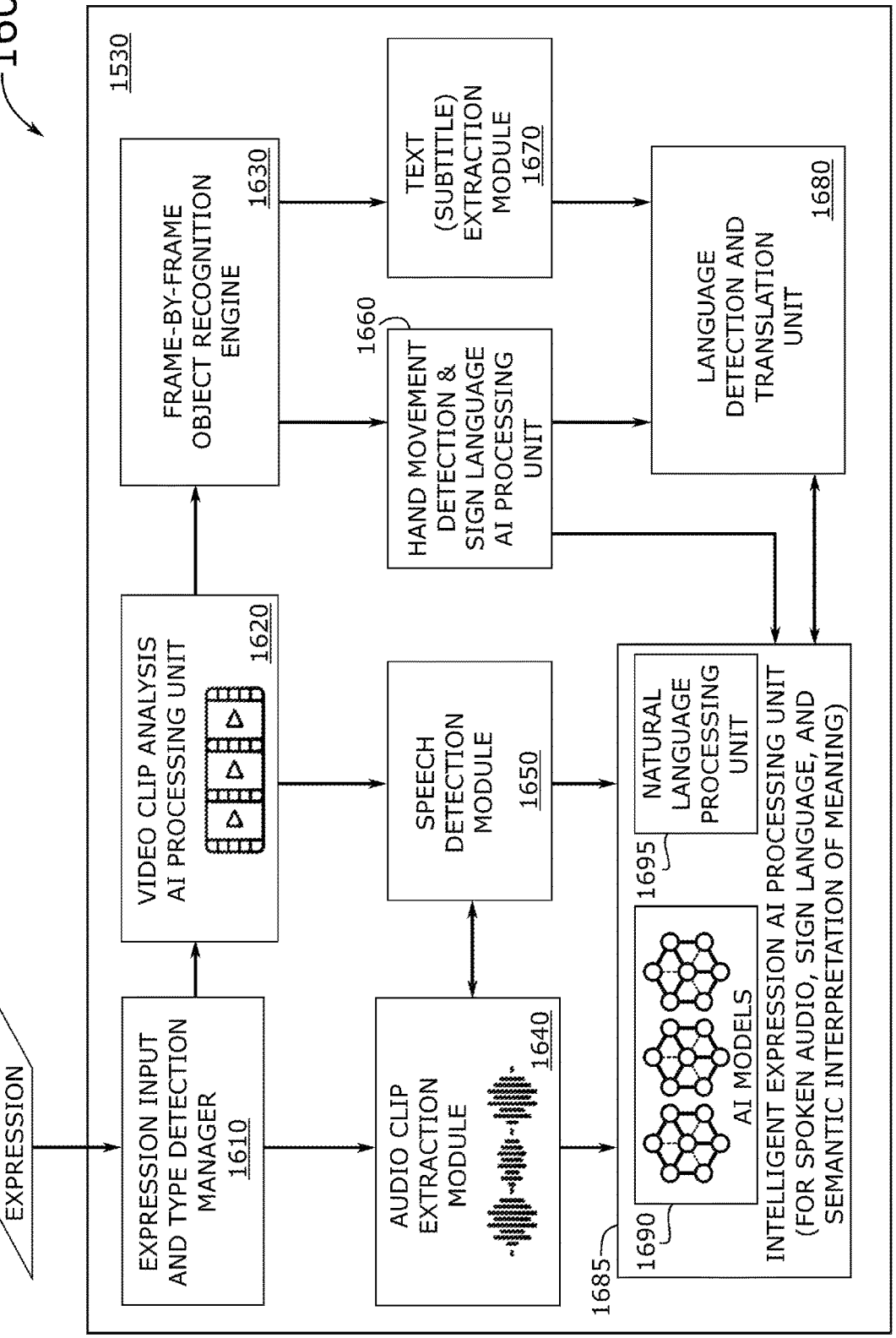
FIG. 16 conceptually illustrates a detailed schematic of an AI expression recognition and NLP engine that performs intelligent semantic analysis and processing of expressions communicated in any of several forms in some embodiments.

By way of example, FIG. 16 conceptually illustrates an AI expression recognition and NLP engine 1600 that performs intelligent semantic analysis and processing of expressions communicated in any of several forms. In some embodiments, the AI expression recognition and NLP engine 1600 is an incorporated into the universal language assistive translation and interpretation system. In some other embodiments, the AI expression recognition and NLP engine 1600 is an external system that is accessible to the universal language assistive translation and interpretation system by network connection (e.g., over the Internet).

As shown in this figure, the AI expression recognition and NLP engine 1600 comprises an expression input and type detection manager 1610, a video clip AI processing unit 1620, a frame-by-frame object recognition engine 1630, an audio clip extraction module 1640, a speech detection module 1650, a hand movement detection & sign language AI processing unit 1660, a text (subtitle) extraction module 1670, a language detection and translation unit 1680, and an intelligent expression AI processing unit 1685. Also, the intelligent expression AI processing unit 1685 comprises a plurality of AI models 1690 (which may be logically stored in and retrieved from the AI-models-for-sign-language-and-audio/voice-expression database 1532) and a natural language processing (NLP) unit 1695.

The AI expression recognition and NLP engine 1600 works by processing expressions it receives in various formats and different languages. For instance, an audio clip, a video clip, an animation, a sequence of images (e.g., a GIF), etc. Specifically, an incoming expression is received by the expression input and type detection manager 1610 which analyzes the expression to determine in which type of format the expression is presented (e.g., video, animation, audio, video+audio, video without audio, GIF, etc.).

When the expression type is an audio-only form of expression, the expression input and type detection manager 1610 provides the expression to the audio clip extraction module 1640, which extracts a sound wave of the audio expression. Then the expression input and type detection manager 1610 provides the extracted sound wave of the audio expression to the speech detection module 1650 to identify speech patterns within the sound wave. When speech patterns are detected and identified, the speech detection module 1650 provides the sound wave and the detected/identified speech patterns to the NLP unit 1695 of the intelligent expression AI processing unit 1685 for speech-to-text processing. The NLP processing unit 1695 then generates a written word (text) equivalent to the speech in the sound wave. However, if the speech detection module 1650 is unable to clearly identify speech patterns in the sound wave, the audio clip extraction module 1640 provides the extract sound wave to the intelligent expression AI processing unit 1685 for AI model-based intelligent processing to clarify audible content within the sound wave to identify speech in language variations (e.g., Pidgin English), vocalizations in song, coded speech (e.g., language argots, such as Pig Latin), modified or enhanced vocalizations (e.g., human speech that is voice coded through a vocoder device, or other digital apparatus configured to modify or enhance audio), etc. In some embodiments, the intelligent expression AI processing unit 1685 utilizes one or more AI models 1690 to clarify the speech that may be present in the sound wave and also to perform semantic interpretation of the clarified speech to identify underlying meaning in the expression.

When the expression type is a video form of expression (which includes live action video captured by a camera, animation generated digitally by a computer graphics imagery (CGI) application, movie GIF with a sequence of images, etc.), the expression input and type detection manager 1610 provides the video expression to the video clip analysis AI processing unit 1620. The video clip analysis AI processing unit 1620 performs a first pass of the video expression to determine if there is audio to process. When there is audio included in the video expression, the video clip analysis AI processing unit 1620 provides the video expression to the speech detection module 1650, which calls on the audio clip extraction module 1640 to extract a sound wave of the audio present in the video expression. Then the speech detection module 1650 analyzes the sound wave to determine whether there are detectable vocal patterns to identify or not. Further processing of the sound wave is carried out in the manner noted above.

Whether detectable speech could be ascertained from the sound wave extracted from the audio of the video expression or not, the video clip analysis AI processing unit 1620 also provides the video expression to the frame-by-frame object recognition engine 1630, which analyzes each frame (image) of the video to identify objects within each frame/image. Objects of concern in this matter include hand gestures, hand movements, etc., which may indicate that the video expression includes sign language. Thus, when detectable objects indicate possible sign language expressions, the frame-by-frame object recognition engine 1630 provides the video expression to the hand movement detection & sign language AI processing unit 1660. In some embodiments, the hand movement detection & sign language AI processing unit 1660 utilizes one of the AI models 1690 (e.g., a hand movement/sign language AI model via the intelligent expression AI processing unit 1685 to identify specific characteristics of the detected hand movements and identify corresponding sign language letters, words, expressions, etc. In some embodiments, the hand movement detection & sign language AI processing unit 1660 also provides the video expression to the language detection and translation unit 1680 which also calls the intelligent expression AI processing unit 1685 and at least one of the AI models 1690 (e.g., language-based sign language AI model) to determine whether the detect hand movements relate to one or another sign language (e.g., ASL, BSL, CSL, LSF, etc.). Furthermore, the language detection and translation unit 1680 works to translate the specific language sign language expression to another language when the second user prefers another language in which to receive the expression (in either sign language or other based on second user's preferences).

Additionally, while performing the first pass review of the video expression, the frame-by-frame object recognition engine 1630 may detect text objects in the video expression, such as subtitles, placards or sheets with written words, etc. When such text is detected, the frame-by-frame object recognition engine 1630 provides the video expression to the text (subtitle) extraction module 1670, which extracts all visible text in each frame. In this specification, text also refers to characters, such as characters in Mandarin (Chinese), Kanji (Japanese), and others. When needed, the text (subtitle) extraction module 1670 performs optical character recognition to identify particular letters, words, etc., the extracted text. The text (subtitle) extraction module 1670 then assembles the extracted text in a logical order ("ordered text expression") that is typically performed in sequence and from top left to top right, moving downward, as in English reading style. However, if characters of another language are detected, the sequence for ordering the text expression may follow a different routine, such as top left down and then moving to the right, as may be practiced, e.g., in Japanese (Kanji) writing. Then the text (subtitle) extraction module 1670 provides the ordered text expression to the language detection and translation unit 1680 for translating to a language preferred by the second user (that is, when the language preferences of the first user and the second user differ).

In this specification, the terms "software", "application", and "program" (referred to below as "software") are meant to include firmware residing in read-only memory or applications stored in magnetic storage, which can be read into memory for processing by a processor, such as the processor of a mobile computing device or a mobile communication device, such as a smartphone, a hand-held computing device, or a tablet computing device (referred to simply as a "mobile device"), or the processor of a traditional computing device, such as a server computer, a desktop computer, or a laptop computer (referred to simply as a "computer"). Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define specific machine implementations that execute and perform the operations of the software programs.

Figure 17:
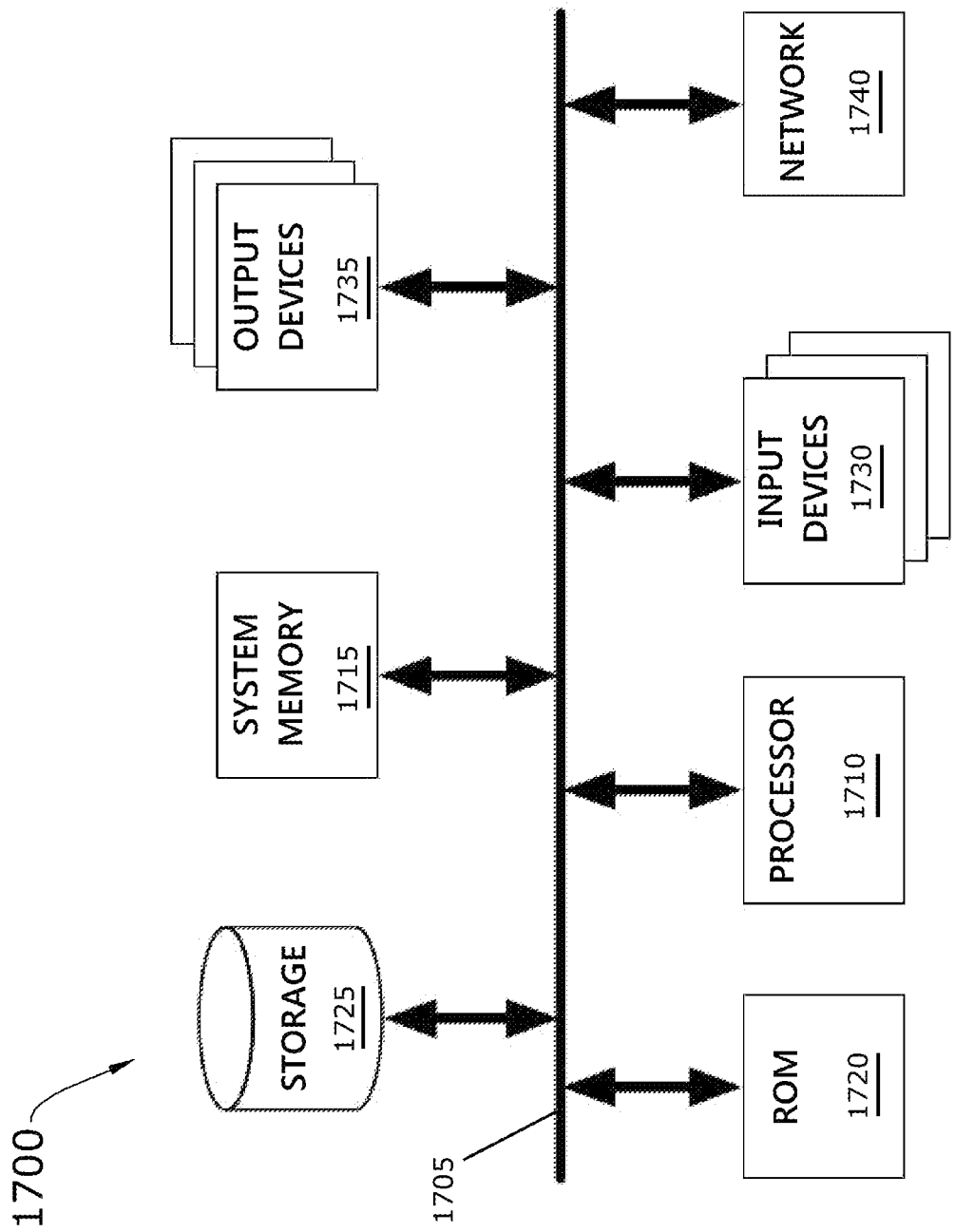
FIG. 17 conceptually illustrates an electronic system with which some embodiments of the invention are implemented.

FIG. 17 conceptually illustrates an electronic system 1700 with which some embodiments of the invention are implemented. The electronic system 1700 may be a computer, mobile device, tablet, phone, refreshable braille device (RBD), or any other sort of electronic device. Such an electronic system includes various types of computer readable media and interfaces for various other types of computer readable media. Electronic system 1700 includes a bus 1705, processing unit(s) 1710, a system memory 1715, a read-only memory 1720, a permanent storage device 1725, input devices 1730, output devices 1735, and a network 1740.

The bus 1705 collectively represents all system, peripheral, and chipset buses that communicatively connect the numerous internal devices of the electronic system 1700. For instance, the bus 1705 communicatively connects the processing unit(s) 1710 with the read-only memory 1720, the system memory 1715, and the permanent storage device 1725. From these various memory units, the processing unit(s) 1710 retrieves instructions to execute and data to process in order to execute the processes of the invention. The processing unit(s) may be a single processor or a multi-core processor in different embodiments.

The read-only-memory (ROM) 1720 stores static data and instructions that are needed by the processing unit(s) 1710 and other modules of the electronic system. The permanent storage device 1725, on the other hand, is a read-and-write memory device. This device is a non-volatile memory unit that stores instructions and data even when the electronic system 1700 is off. Some embodiments of the invention use a mass-storage device (such as a magnetic or optical disk and its corresponding disk drive) as the permanent storage device 1725.

Other embodiments use a removable storage device (such as a floppy disk or a flash drive) as the permanent storage device 1725. Like the permanent storage device 1725, the system memory 1715 is a read-and-write memory device. However, unlike storage device 1725, the system memory 1715 is a volatile read-and-write memory, such as a random access memory. The system memory 1715 stores some of the instructions and data that the processor needs at runtime. In some embodiments, the invention's processes are stored in the system memory 1715, the permanent storage device 1725, and/or the read-only memory 1720. For example, the various memory units include instructions for processing appearance alterations of displayable characters in accordance with some embodiments. From these various memory units, the processing unit(s) 1710 retrieves instructions to execute and data to process in order to execute the processes.

The bus 1705 also connects to the input and output devices 1730 and 1735. The input devices enable the user to communicate expressions to the electronic system. The input devices 1730 include alphanumeric keyboards, RBDs, microphones, cameras, and cursor control devices, among others. The output devices 1735 may display sign language imagery, videos, GIFs, gestures, etc., or may audibly output speech or other audio, or may actuate pins in the respective braille cells of a RBD, such as a Perkins-style keyboard or other RBD. Thus, the output devices 1735 include display devices, such as liquid crystal displays (LCD) and organic light emitting diode (OLED) displays, RBDs, braille printers, audio speakers, etc.

Finally, as shown in FIG. 17, bus 1705 also couples electronic system 1700 to a network 1740 through a network adapter (not shown). In this manner, the computer can be a part of a network of computers (such as a local area network ("LAN"), a wide area network ("WAN"), or an intranet), or a network of networks (such as the Internet). Any or all components of electronic system 1700 may be used in conjunction with the invention.

These functions described above can be implemented in digital electronic circuitry, in computer software, firmware or hardware. The techniques can be implemented using one or more computer program products. Programmable processors/computers can be packaged or included in mobile devices. The processes may be performed by one or more programmable processors and by one or more set of programmable logic circuitry. General and special purpose computing and storage devices can be interconnected through communication networks.

While the invention has been described with reference to numerous specific details, one of ordinary skill in the art will recognize that the invention can be embodied in other specific forms without departing from the spirit of the invention. For instance, many of the drawings conceptually illustrate processes. However, the specific operations of each process may not be performed in the exact order shown and described. Specific operations may not be performed in one continuous series of operations, and different specific operations may be performed in different embodiments. Furthermore, each process could be implemented using several sub-processes, or as part of a larger macro process. Thus, one of ordinary skill in the art would understand that the invention is not to be limited by the foregoing illustrative details, but rather is to be defined by the appended claims.

I claim:

1. A universal language assistive translation and interpretation system that verifies and validates translations and interpretations by way of blockchain technology and smart contracts, the universal language assistive translation and interpretation system comprising:
    a blockchain that is configured to immutably record validated cross-format interpretations and translations of expressions;
    a plurality of nodes comprising passive user nodes, contributor nodes, and authorized nodes that validate and write transactions to blocks in the blockchain;
    a smart contract stored on the blockchain and configured to execute to validate a particular cross-format interpretation and translation of a particular expression and distribute tokens to a particular contributor node who provides the particular cross-format interpretation and translation and a trusted evaluator authorized node who reviews the particular cross-format interpretation and translation for accuracy before validation;
    a universal language assistive translation and interpretation server comprising an expression creation system that is configured to make requests to the plurality of nodes to provide cross-format interpretations and translations of expressions and to trigger execution of the smart contract to distribute tokens to nodes who provide the cross-format interpretations and translations of the expressions and nodes who validate and record, on the blockchain, the cross-format interpretations and translations;
    a client application session and expression input and output manager to which user devices connect to engage in cross-format communication across one of a plurality of communication channels; and
    an artificial intelligence (AI) expression recognition and natural language processing (NLP) engine that is communicably connected to the universal language assistive translation and interpretation server and is configured to provide cross-format interpretations and translations when a first user is connected to a second user over a particular communication channel in connection with the client application session and expression input and output manager and the first user provides an expression in a first form that needs a particular cross-format interpretation and translation to a second form for the second user but no node in the plurality of nodes provides the particular cross-format interpretation and translation.

2. The universal language assistive translation and interpretation system of claim 1 further comprising a registered user settings database that is configured to store user registration data and permissions that designate each user as one of a passive user, a contributor user, and an authorized user.

3. The universal language assistive translation and interpretation system of claim 1 further comprising a sign language and speech expression AI model database that is communicably connected to the AI expression recognition and NLP engine.

4. The universal language assistive translation and interpretation system of claim 1 further comprising an external oracle system that is configured to interact with resources outside of the blockchain.

5. The universal language assistive translation and interpretation system of claim 4 further comprising a plurality of off-chain content databases.

6. The universal language assistive translation and interpretation system of claim 5, wherein at least one off-chain content database is configured to store audio clips of speech expressions for users with vision impairments.

7. The universal language assistive translation and interpretation system of claim 6, wherein at least one other off-chain content database is configured to store video of sign language expressions for users with hearing impairments.

8. A universal language assistive translation and interpretation system that verifies and validates translations and interpretations by way of blockchain technology and smart contracts, the universal language assistive translation and interpretation system comprising:
    a blockchain that is configured to immutably record validated cross-format interpretations and translations of expressions;
    an external oracle system that is configured to interact with resources outside of the blockchain;
    a plurality of off-chain content databases, wherein at least one off-chain content database is configured to store audio clips of speech expressions for users with vision impairments;
    a plurality of nodes comprising passive user nodes, contributor nodes, and authorized nodes that validate and write transactions to blocks in the blockchain;
    a smart contract stored on the blockchain and configured to execute to validate a particular cross-format interpretation and translation of a particular expression and distribute tokens to a particular contributor node who provides the particular cross-format interpretation and translation and a trusted evaluator authorized node who reviews the particular cross-format interpretation and translation for accuracy before validation; and
    a universal language assistive translation and interpretation server comprising an expression creation system that is configured to make requests to the plurality of nodes to provide cross-format interpretations and translations of expressions and to trigger execution of the smart contract to distribute tokens to nodes who provide the cross-format interpretations and translations of the expressions and nodes who validate and record, on the blockchain, the cross-format interpretations and translations.

9. The universal language assistive translation and interpretation system of claim 8, wherein at least one other off-chain content database is configured to store video of sign language expressions for users with hearing impairments.

10. The universal language assistive translation and interpretation system of claim 8 further comprising a client application session and expression input and output manager to which user devices connect to engage in cross-format communication across one of a plurality of communication channels.

11. The universal language assistive translation and interpretation system of claim 10 further comprising an artificial intelligence (AI) expression recognition and natural language processing (NLP) engine that is communicably connected to the universal language assistive translation and interpretation server.

12. The universal language assistive translation and interpretation system of claim 11, wherein the AI expression recognition and NLP engine is configured to provide cross-format interpretations and translations when a first user is connected to a second user over a particular communication channel in connection with the client application session and expression input and output manager and the first user provides an expression in a first form that needs a particular cross-format interpretation and translation to a second form for the second user but no node in the plurality of nodes provides the particular cross-format interpretation and translation.

13. The universal language assistive translation and interpretation system of claim 11 further comprising a sign language and speech expression AI model database that is communicably connected to the AI expression recognition and NLP engine.

14. A universal language assistive translation and interpretation system that verifies and validates translations and interpretations by way of blockchain technology and smart contracts, the universal language assistive translation and interpretation system comprising:
   a blockchain that is configured to immutably record validated cross-format interpretations and translations of expressions;
   an external oracle system that is configured to interact with resources outside of the blockchain;
   a plurality of off-chain content databases, wherein at least one off-chain content database is configured to store video of sign language expressions for users with hearing impairments;
   a plurality of nodes comprising passive user nodes, contributor nodes, and authorized nodes that validate and write transactions to blocks in the blockchain;
   a smart contract stored on the blockchain and configured to execute to validate a particular cross-format interpretation and translation of a particular expression and distribute tokens to a particular contributor node who provides the particular cross-format interpretation and translation and a trusted evaluator authorized node who reviews the particular cross-format interpretation and translation for accuracy before validation; and
   a universal language assistive translation and interpretation server comprising an expression creation system that is configured to make requests to the plurality of nodes to provide cross-format interpretations and translations of expressions and to trigger execution of the smart contract to distribute tokens to nodes who provide the cross-format interpretations and translations of the expressions and nodes who validate and record, on the blockchain, the cross-format interpretations and translations.

15. The universal language assistive translation and interpretation system of claim 14, wherein at least one other off-chain content database is configured to store audio clips of speech expressions for users with vision impairments.

16. The universal language assistive translation and interpretation system of claim 14 further comprising:
   a client application session and expression input and output manager to which user devices connect to engage in cross-format communication across one of a plurality of communication channels;
   an artificial intelligence (AI) expression recognition and natural language processing (NLP) engine that is communicably connected to the universal language assistive translation and interpretation server; and
   a sign language and speech expression AI model database that is communicably connected to the AI expression recognition and NLP engine.

17. The universal language assistive translation and interpretation system of claim 16, wherein the AI expression recognition and NLP engine is configured to provide cross-format interpretations and translations when a first user is connected to a second user over a particular communication channel in connection with the client application session and expression input and output manager and the first user provides an expression in a first form that needs a particular cross-format interpretation and translation to a second form for the second user but no node in the plurality of nodes provides the particular cross-format interpretation and translation.

* * * * *